United States Patent
Zhang et al.

(10) Patent No.: US 10,805,647 B2
(45) Date of Patent: Oct. 13, 2020

(54) AUTOMATIC PERSONALIZED STORY GENERATION FOR VISUAL MEDIA

(71) Applicant: Facebook, Inc., Menlo Park, CA (US)

(72) Inventors: Ying Zhang, Palo Alto, CA (US); Shengbo Guo, San Jose, CA (US)

(73) Assignee: FACEBOOK, INC., Menlo Park, CA (US)

( * ) Notice: Subject to any disclaimer, the term of this patent is extended or adjusted under 35 U.S.C. 154(b) by 208 days.

(21) Appl. No.: 15/850,746

(22) Filed: Dec. 21, 2017

(65) Prior Publication Data

US 2019/0200050 A1   Jun. 27, 2019

(51) Int. Cl.
| | |
|---|---|
| *G06K 9/00* | (2006.01) |
| *H04N 21/234* | (2011.01) |
| *G06Q 50/00* | (2012.01) |
| *G06F 40/10* | (2020.01) |
| *G06F 40/20* | (2020.01) |
| *G06F 40/56* | (2020.01) |

(52) U.S. Cl.
CPC ....... *H04N 21/23418* (2013.01); *G06F 40/10* (2020.01); *G06F 40/20* (2020.01); *G06F 40/56* (2020.01); *G06K 9/00751* (2013.01); *G06Q 50/01* (2013.01)

(58) Field of Classification Search
CPC ...... G06F 17/27; G06F 17/21; G06F 17/2881; H04N 21/23418; G06Q 50/01; G06K 9/00751
See application file for complete search history.

(56) References Cited

U.S. PATENT DOCUMENTS

| | | | | |
|---|---|---|---|---|
| 9,317,531 | B2* | 4/2016 | Baker | G06F 16/58 |
| 2008/0140706 | A1* | 6/2008 | Kahn | G06F 16/58 |
| 2011/0016150 | A1* | 1/2011 | Engstrom | G06F 16/58 |
| | | | | 707/778 |
| 2014/0214533 | A1* | 7/2014 | Box | G06Q 30/0269 |
| | | | | 705/14.49 |
| 2017/0004825 | A1* | 1/2017 | Mishra | G10L 17/22 |
| 2017/0132821 | A1* | 5/2017 | Valliani | G06K 9/6267 |

(Continued)

OTHER PUBLICATIONS

Honan et al, ("Video Paragraph Captioning Using Hierarchical Recurrent Neural Networks", 2016 IEEE Conference on Computer Vision and Pattern Recognition, pp. 4585-4593), (Year: 2016).*

(Continued)

*Primary Examiner* — Amara Abdi

(57) ABSTRACT

Exemplary embodiments relate to the automatic generation of captions for visual media, including photos, photo albums, non-live video, and live video. The visual media may be analyzed to determine contextual information (such as location information, people and objects in the video, time, etc.). A system may integrate this information with information from the user's social network and a personalized language model built using public-facing language from the user. The personalized language model captures the user's way of speaking to make the generated captions more detailed and personalized. The language model may account for the context in which the video was generated. The captions maybe used to simplify and encourage content generation, and may also be used to index visual media, rank the media, and recommend the media to users likely to engage with the media.

17 Claims, 14 Drawing Sheets

(56) References Cited

U.S. PATENT DOCUMENTS

2017/0177623 A1* 6/2017 Chen .................... G06F 16/285
2018/0150444 A1* 5/2018 Kasina ................ G06F 16/4393

OTHER PUBLICATIONS

Yu, Haonan, et al., "Video paragraph captioning using hierarchical recurrent neural netwrorks." Proceedings of the IEEE conference on computer vision and pattern recognition. 2016.

* cited by examiner

Personalized Language Model Logic
400

Centralized Communication System 500

AUTOMATIC PERSONALIZED STORY GENERATION FOR VISUAL MEDIA

BACKGROUND

Some services (such as social networking services, media sharing services, etc.) allow users to share visual media (such as photographs, videos, live video feeds, etc.) with other users. Optionally, the user may create a caption for the visual media that describes the visual media. Such captions may be manually generated by the user. Because generating the caption requires effort, users often fail to assign a caption, or assign a brief or generic caption. Such cursory captions may be of little use to users who may be interested in viewing the visual media (including the originating user, who may wish to revisit the visual media in the future) and to services, such as search services that attempt to find visual media related to certain topics.

DETAILED DESCRIPTION

Figure 1A:
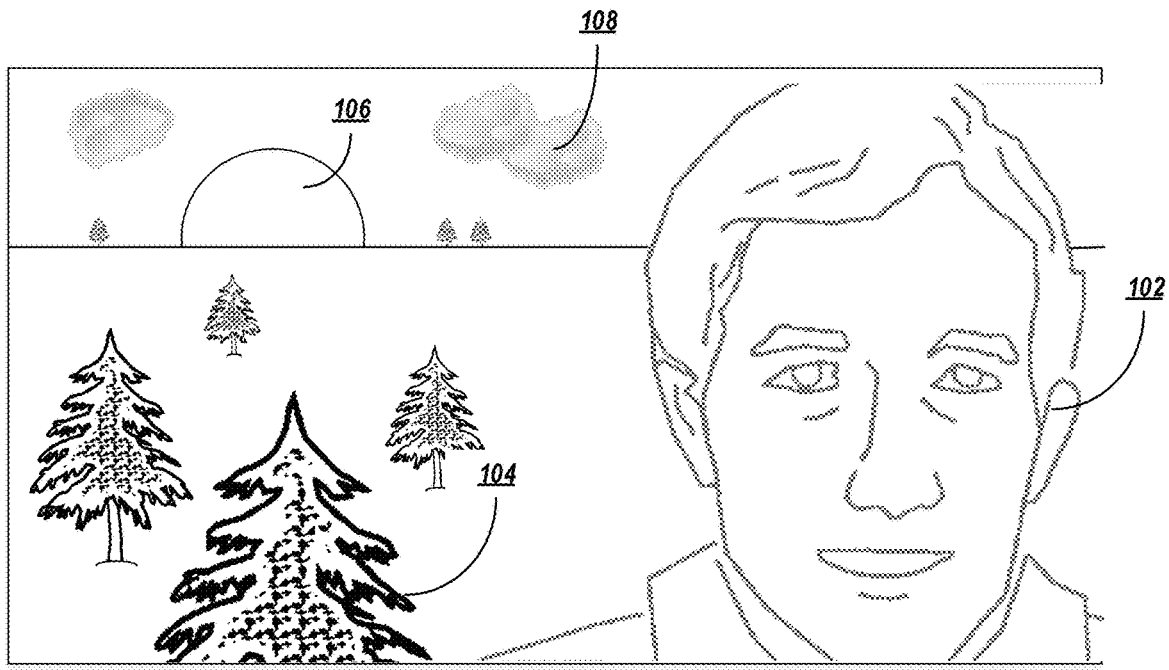
FIG. 1A depicts an exemplary interface showing a frame from a video stream of a user in a forest.

One possible solution to this problem is to automatically associate metadata with the visual media. For example, when a photograph or video is captured, metadata such as the time and date of capture and possibly the location of the capture may be stored along with the media content. In some cases, facial recognition may be applied to pictures to identify people in the image. These types of information may be used to tag the media.

However, this potential solution remains problematic for several reasons. For example, such tags are often impersonal and may be ignored by readers. Some users may prefer that the captions on their related visual media share some continuity be in a story format. For instance, if a user posts multiple pictures to a photo album, the user may desire that the captions on the pictures describe the pictures in a story form, using a consistent narrative. Similarly, if a user posts a video or broadcasts a live video, it may be difficult to capture a full description of the video in a single caption. Accordingly, it may be desirable to generate multiple captions describing different parts of the video, where the multiple captions are consistent and/or provide a description in a narrative form.

To these and other ends, exemplary embodiments described herein relate to the application of story or narrative generation to automatically generate captions for visual media, including photos, photo albums, non-live video, and live video.

The visual media may be analyzed to determine contextual information (such as location information, people and objects in the video, time, etc.). For example, object recognition may be applied to a photo or to frames in a video stream. In another example, facial recognition may be applied to the visual media to identify people in the visual media. Furthermore, information captured in conjunction with the visual media, such as audio information, may be analyzed for context. Still further, metadata associated with the visual media, such as a location tag, timestamp, etc. may be used to identify other aspects of the video.

A system may integrate this information with information from the user's social network and a personalized language model built using public-facing language from the user. The personalized language model captures the user's way of speaking to make the generated captions more detailed and personalized. The personalized language model may be configured to generate a description or caption in a narrative style consistent with the user's public-facing language.

If there is insufficient material to generate a personalized language model for a target user, the system may analyze the public-facing language of other users connected to the target user in the social graph (e.g., users sharing a high affinity with the target user). The language model may account for the context in which the video was generated (e.g., a person may have one style of captioning when taking a picture of their children and another when live-streaming from a sports bar).

The captions maybe used to simplify and encourage content generation, and may also be used to index visual media, rank the media, and recommend the media to users likely to engage with the media.

Some embodiments may provide an API so that outside sources can make use of the auto-captioning feature (e.g., a local news station might use the captioning feature to automatically generate descriptions of visual media).

Further embodiments, which may be used in conjunction with the embodiments described above, relate to the application of story generation to live video. As a user records live video, a system analyzes metadata, the frames of the video, and/or the audio to extract context information (such as location information, people and objects in the video, time, etc.). The system may integrate this information with information from the user's social network and a personalized language model built using public-facing language from the user.

The system may generate multiple captions for the video, where subsequent captions are based at least partially on previous captions. Captions may be generated in a story format so as to be consistent with each other. Information that is inconsistent with the story may be excluded from the captions unless contextual factors indicate that the story should change course.

This brief summary is intended to serve as a non-limiting introduction to the concepts discussed in more detail below. However, before discussing further exemplary embodiments, a brief note on data privacy is first provided. A more detailed description of privacy settings and authentication will be addressed in connection with the following Figures.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous video conversation in a messaging system is next provided As an aid to understanding, a series of examples will first be presented before detailed descriptions of the underlying implementations are described. It is noted that these examples are intended to be illustrative only and that the present invention is not limited to the embodiments shown.

Exemplary Interfaces

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-*a* may include components 122-1, 122-2, 122-3, 122-4, and 122-5. The embodiments are not limited in this context.

FIGS. 1A-1D depict exemplary photos, as might be presented (for example) in a photo album; alternatively, the images might be frames from a video stream. For instance, the visual media depicted in FIG. 1A shows an individual in a forest. According to exemplary embodiments, the visual media may be analyzed to identify contextual information about the visual media.

In the example of FIG. 1A, object recognition may be applied to identify an object corresponding to a face 102, and facial recognition may be applied to the face 102 to identify a network user associated with the face 102. Similarly, object recognition may be applied to the visual media to identify other objects. In this example, the system may recognize one or more tree objects 104, a sun object 106, and one or more cloud objects 108.

The information derived from the analysis of the scene may be combined with metadata associated with the visual media, such as metadata captured by one or more sensors or other instruments in the capture device that captured the visual media. The sensors or instruments may include, for example, a GPS receiver, a clock, a thermometer, a microphone, a barometer, an accelerometer, etc.

The information may also be combined with information from a network, such as the user's social network and/or third party network sources. For example, the user's check-in data or calendar information in the social network may be consulted, as well as information from other users connected to the current user in the network. In another example, third-party information sources, such as news or weather sources, may be consulted.

The combined information may be used to identify a context of the visual media. For example, analysis of the objects in the visual media may indicate that the user associated with the face 102 is in a forest at sunrise or sunset. A timestamp from the capture device may indicate that the time is early morning, and a GPS receiver may indicate that the media was captured at a National Park. Information from the user's social network may indicate that the user is an avid camper, and an entry in the user's social network may suggest that the user intended to go camping this weekend.

The system may provide this contextual information to a personalized language model. The personalized language model may be configured using public-facing language from the user's social network. Public-facing language includes language that the user has made available to the public, or certain members of the public (e.g., friends or particular groups of friends) in the network. The public-facing language may be taken from, e.g., posts that the user has generated in the network, comments on information in the network, etc. It may exclude private information, such as private communications between the user and another user or group of users.

The personalized language model may be configured to generate narrative descriptions in a communication style that matches the user's public-facing language. The personalized language model may mimic the user's vocabulary, sentence structure, and other aspects of the user's speech.

Returning to the example from FIG. 1A, the system may use the information from the analysis of the visual media to infer that the user is on a camping trip. The system may provide the visual media context to the personalized language model to generate a suitable caption for the visual media (e.g., "Got to Yosemite around sunrise" or "Ready for a National Parks camping adventure!"). For another user with a different language model, the same scene might prompt a different caption (e.g., "Let's CAMP!" or "Time to camp, loosahs!").

After the caption is generated, the system may present the caption to the user for approval and/or editing. In some embodiments, the system may generate multiple candidate captions and may allow the user to select among the candidate captions. In further embodiments, the system may automatically associate the caption with the visual media, but the user may be presented with an option to later alter or eliminate the caption, or replace the caption with another automatically- or manually-generated caption.

Additional visual media may be captured and associated with previous visual media (e.g., when visual media capture occurs as part of the same video stream, or when pictures are captured close together in time, or when visual media shares similar subjects or contexts, or when visual media is associated with other visual media by a common designation such as by being present in the same album or otherwise organized together, or by some other technique). As additional related media is captured or otherwise made available, additional descriptions for the new media may be generated.

Figure 1B:
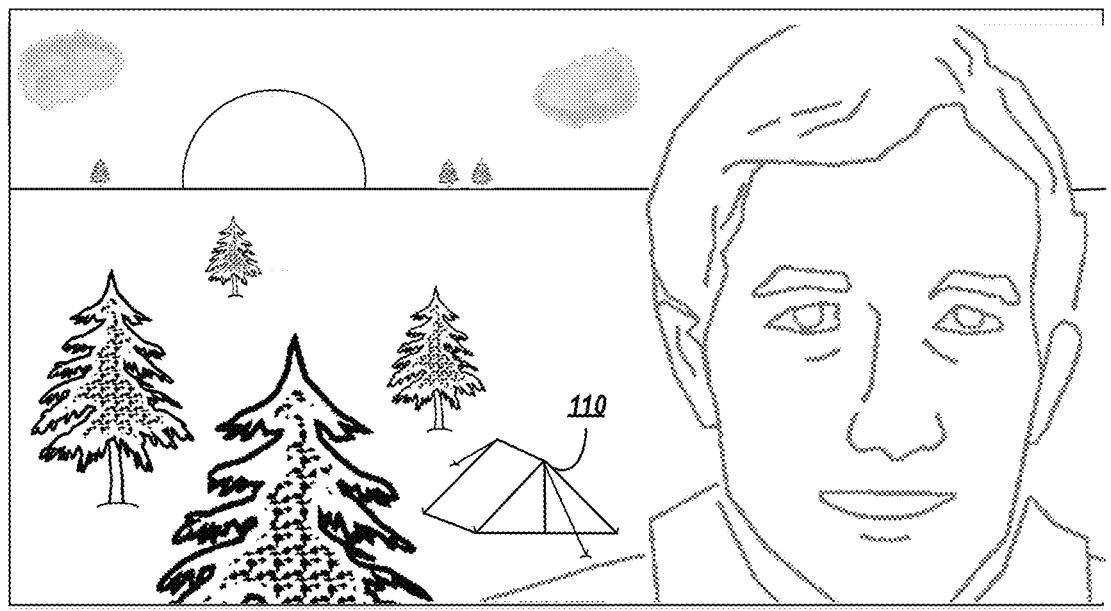
FIG. 1B depicts an exemplary interface showing a frame from a video stream of a user in a forest with an identified tent object in the background.

For example, FIG. 1B depicts a photo captured shortly after the photo of FIG. 1A, or a video frame from later in the video stream as compared to the frame of FIG. 1A. In this media, a new object has been identified: a tent object 110. The system may provide this new context to the personalized language model and may generate a new caption for the new media (e.g., "First order of business: pitching the tent!"). The new caption may be generated, at least in part, based on the previous caption so that the captions are consistent and describe a coherent story or narrative.

The new caption may be consistent with previous captions and/or may carry on a story begun in connection with previous associated media. For example, the new caption may reference a previous caption, or may simply maintain the same context as the previous caption (e.g., a caption about camping may be followed by another camping- or hiking-related caption, instead of being followed by a caption about driving a car or some other unrelated description).

Figure 1C:
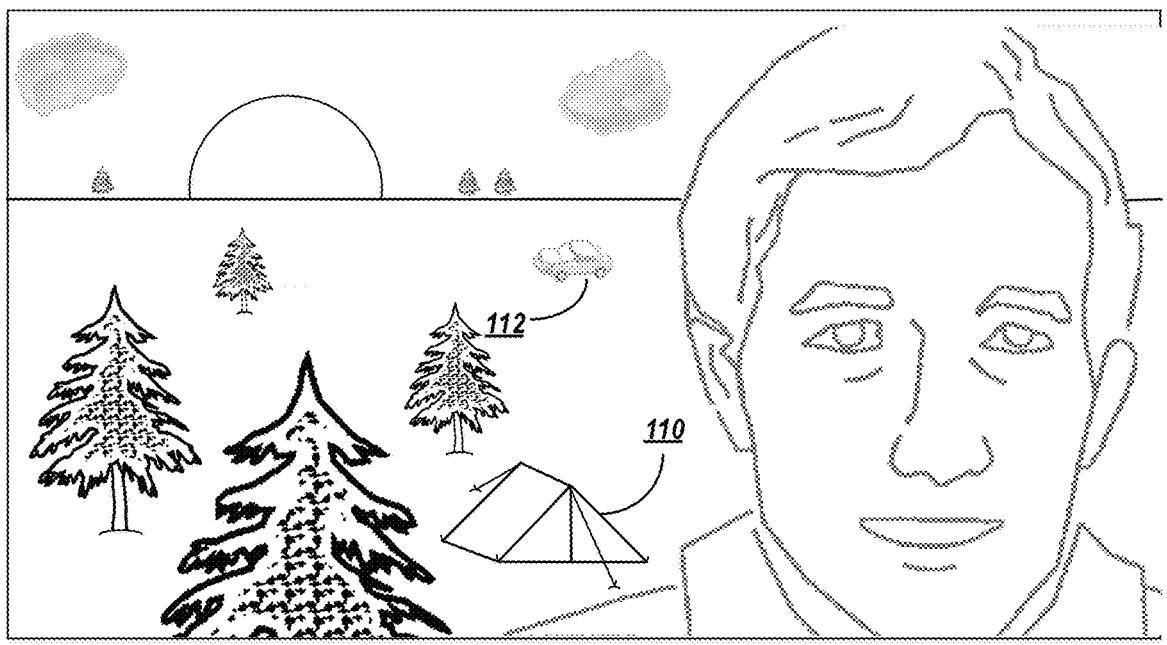
FIG. 1C depicts an exemplary interface showing a frame from a video stream of a user in a forest with an identified car object in the background.

Information that is inconsistent with the narrative in one or more previous captions may be ignored or excluded from consideration. For example, FIG. 1C depicts another photo or video frame captured at some time after the media depicted in FIG. 1A. In this example, the system identifies the presence of a car object 112 in the frame. Because the presence of a car is inconsistent with the identified context of camping, the system may refrain from mentioning the car in the generated caption.

In some cases, the context or other information may indicate that inconsistent features should be included, e.g. the description should shift to refocus on previously inconsistent features. For example, if multiple cars appear in the frame for an extended period of time, it may be that the context should be changed when generating a new caption (e.g., "Can't believe there's a car chase going on behind me!"). Alternatively or in addition, sensor information, social network information, or third party information may suggest a change in context. For instance, if the user pans the camera to focus on the car, this may indicate that the user's interest in the car is sufficient to shift the context of the narrative. If a news story indicates that a car chase is occurring in the area, or if social media posts indicate that the car has some particular relevance, the context may likewise be shifted.

In some cases, information from the public-facing language may indicate that the user has different communication styles in different settings. For instance, when speaking about their children, a user may have a first speaking style, whereas when speaking about their friends, the user may have a second speaking style. The system may generate different personalized language models, or modifications to the personalized language model, depending on the situation presented. Based on the context of the visual media, a different model (or a modification of the model) may be applied to generate the description.

Figure 1D:
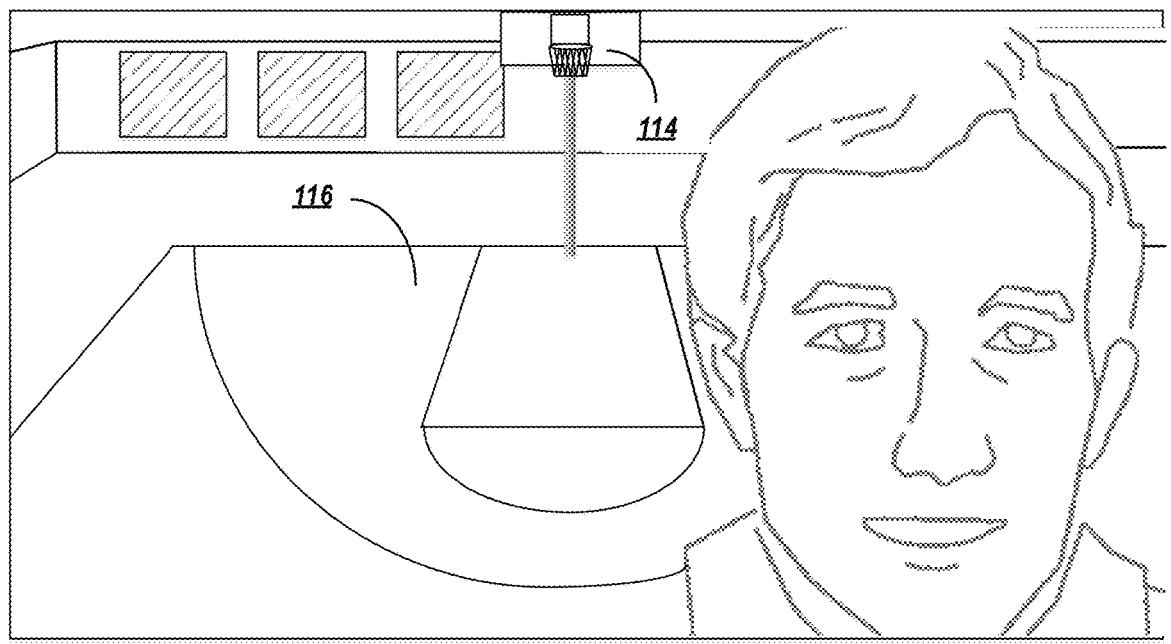
FIG. 1D depicts an exemplary interface showing a frame from a video stream of a user at a basketball game.

For example, FIG. 1D depicts a picture or video frame from the same user as depicted in FIGS. 1A-1C. In this example, context (e.g., based on the detected basketball hoop object 114 and the pattern on the floor 116) may indicate that the user is present at a basketball game. The user may be associated with a different personal language model (or a modification to the user's personal language model) for sporting events as compared to outdoor activities such as camping. In this case, a different personal language model or the modification may be applied to generate a caption in a different, though still personalized, narrative style.

The captions may be applied in a number of contexts. For example, the captions may be displayed in connection with a post of the media in a social networking service. News organizations may apply auto-captioning techniques to generate descriptions for news stories. When sending visual media through a messaging service, the captions may be applied to provide a textual description of messaged visual media. The captions may be stored with the visual media as a searchable index to the visual media, for purposes of locating the visual media and/or selecting visual media of interest for a social network's news feed. Other applications for automatically generated captions/stores are also contemplated.

Figure 2A:
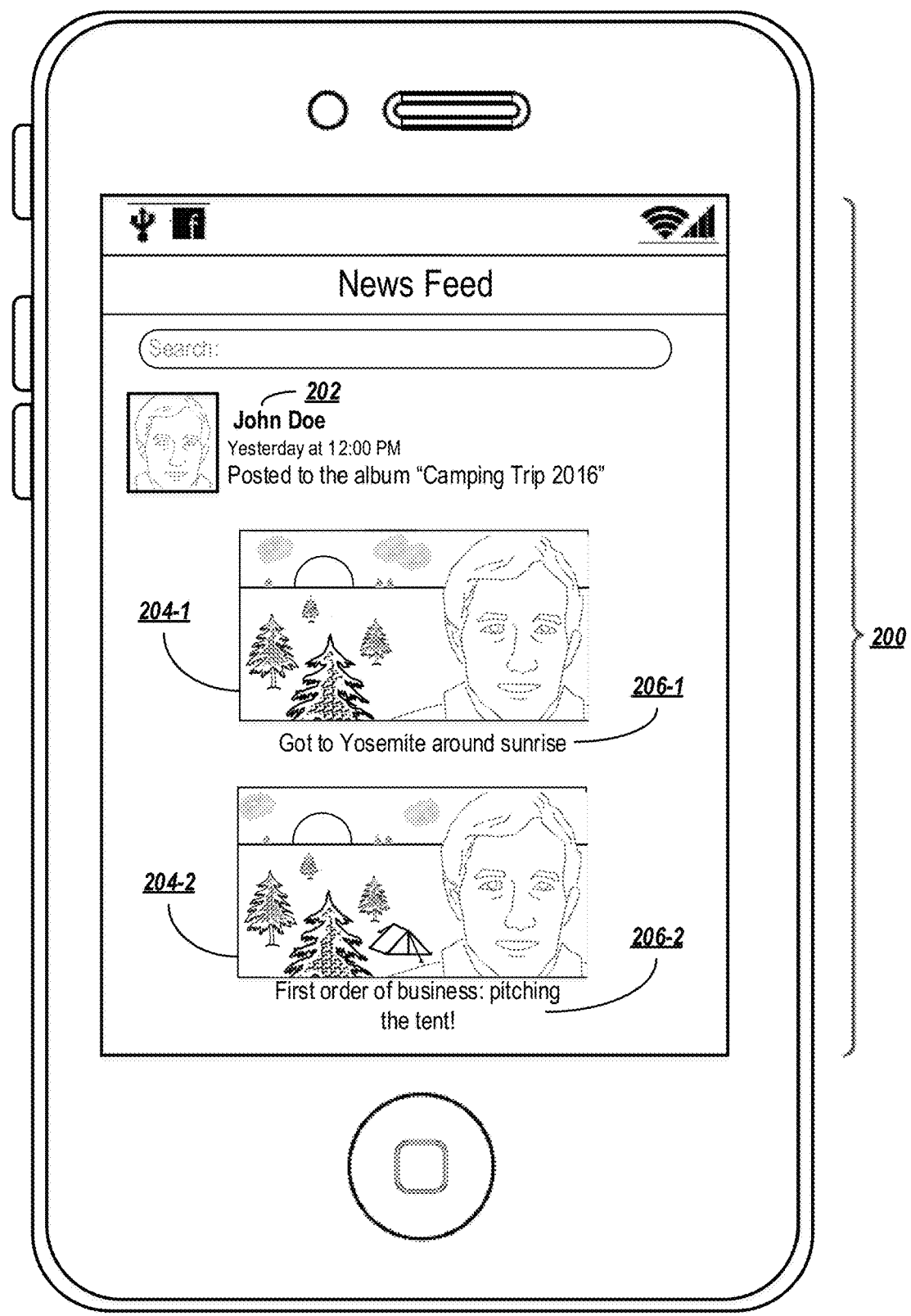
FIG. 2A depicts an exemplary interface showing a post in a social networking service including the frames of FIGS. 1A and 1B.

FIG. 2A depicts an exemplary interface 200 for a social networking service's news feed. The interface 200 includes a first post to the news feed. The post includes descriptive information 202 about the post and post content. The post content includes photos 204-1, 204-2 corresponding to the pictures depicted in FIGS. 1A and 1B, respectively. The descriptions that were automatically generated for the respective photos 204-1, 204-2 may appear in proximity to the photos 204-1, 204-2 as captions 206-1, 206-2.

Figure 2B:
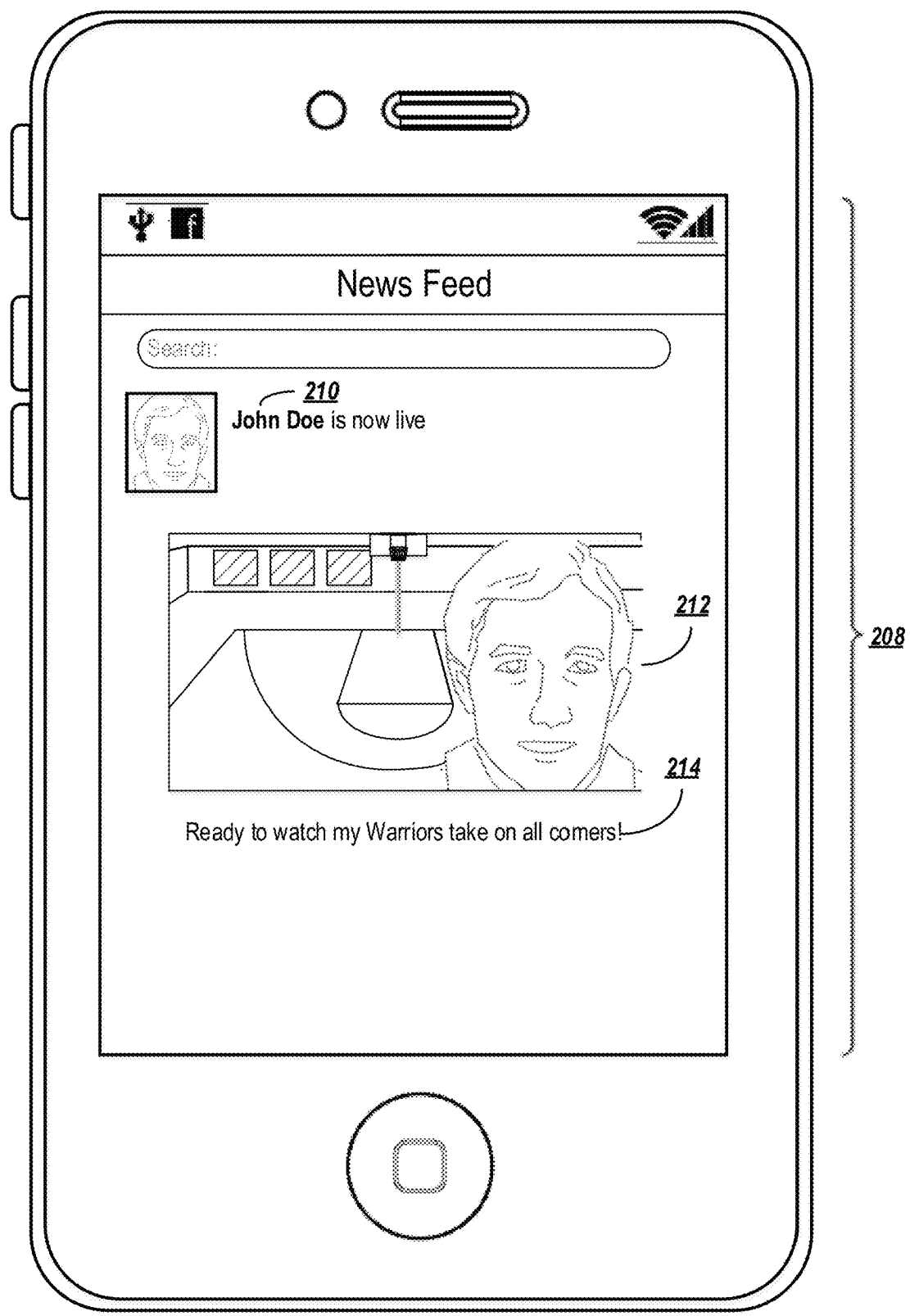
FIG. 2B depicts an exemplary interface showing a post in a social networking service including the frame of FIG. 1D.

FIG. 2B depicts an exemplary interface 208 for a social network service's news feed, displaying a second post in the news feed. The post includes descriptive information 210, as well as a live video 212 corresponding to the frame of FIG. 1D, and a caption 214 corresponding to the automatically-generated description for the live video 212. A caption 214 associated with a live video (or a non-live video) may be updated periodically. For example, as new events occur in the video the caption may be updated to describe the event (e.g., "Warriors score!"). Alternatively or in addition, the caption may be updated after a predetermined period of time, and a new analysis of the video and previous captions may be performed. As new captions 214 are generated, they may replace the old caption. Alternatively or in addition, a new caption may coexist with a new caption (e.g., in a scrollable feed).

Next, exemplary techniques for training personalized language models, applying the personalized language models to automatically generate captions for visual media, and apply the captions to the visual media are described with reference to FIGS. 3-4B.

Data Flow and Exemplary Techniques

Figure 3:
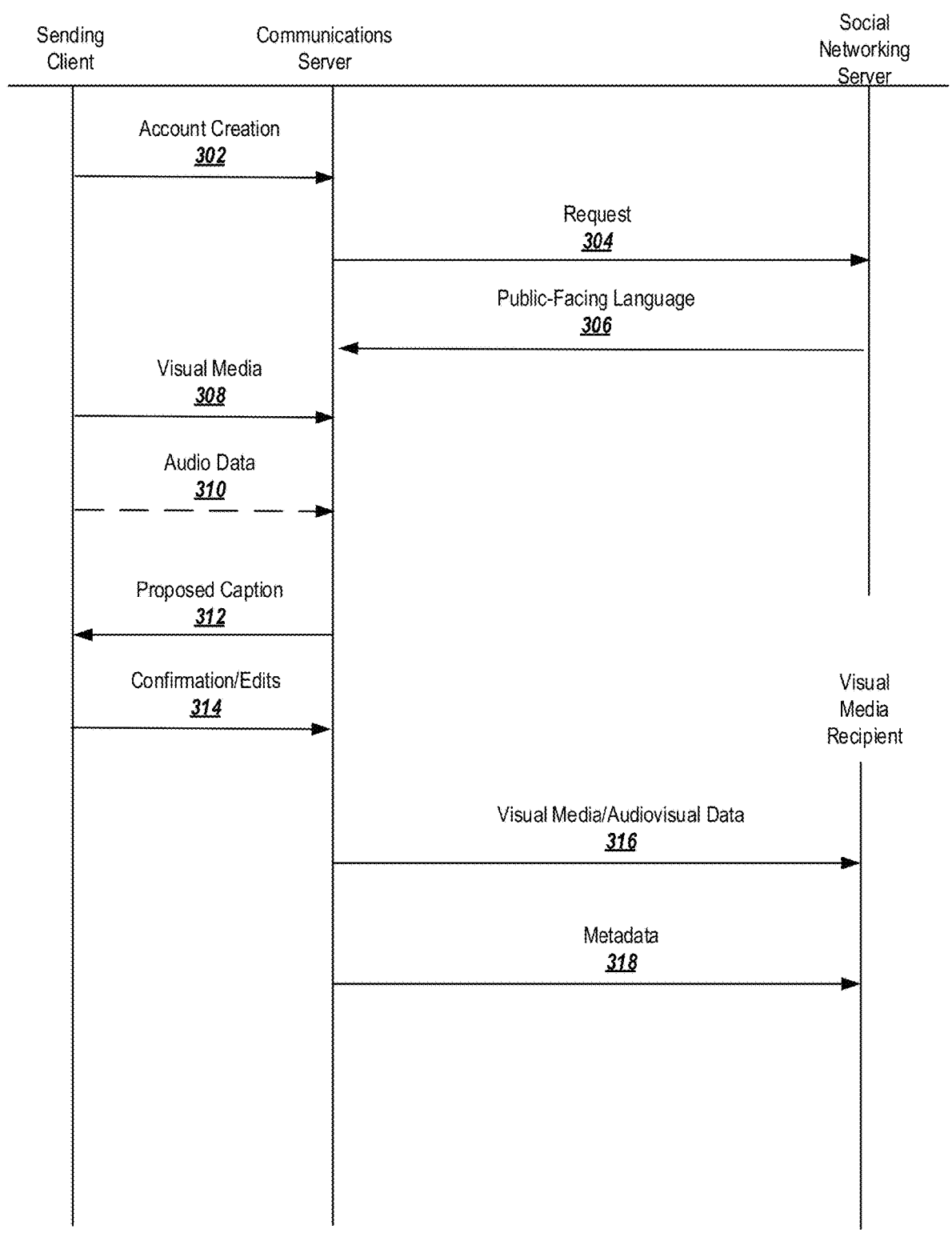
FIG. 3 depicts a data flow diagram showing exemplary information exchange during a caption generation process.

FIG. 3 depicts an exemplary data flow diagram showing information exchange between various devices in a network.

Initially, a sending client may create an account with a communications server configured to distribute visual media from the sending client. The communications server may be, for example, a broadcast server for broadcasting the visual media to a group of recipients, a messaging server for sending visual media as part of an instant message, a visual media sharing service, or may be, or may be integrated with, a social networking server for sharing the visual media with other users of the social network.

Alternatively or in addition, the communications server may be configured to caption the visual media, but not distribute the visual media. For example, the communications server may accept visual media via an Application Program Interface (API) call and may caption the visual media, returning the caption as a response to the API call.

Accordingly, the sending client may send an account creation request 302 to the communications server. The account creation request 302 may designate an associated user for whom the account is being created using a user identifier. The user identifier may be a user identifier for a social networking service, or the account creation request 302 may otherwise specify a user identifier for the social networking service. Optionally, the account creation request 302 may specify authentication information, such as a password, that authenticates the user with the social networking service.

Upon receiving the account creation request 302, the communications server may build one or more personalized language models for a user associated with the sending client. The personalized language model may be a model that accepts a context as an input (e.g., encompassing information describing the visual media such as recognized people or objects, metadata, sensor data, etc.). The context may be processed in view of rules and/or probabilities that generate sentences or phrases using a narrative style of the user. The rules or probabilities may define one or more output sentences or phrases based on a personalized vocabulary, syntax, sentence structure, etc. of the user.

The rules or probabilities may be configured so as to favor vocabulary, sentence structure, syntax, etc. that the user has previously used in public-facing language on the social networking service. For example, the system may analyze the user's posts on the social networking service, comments, etc. to identify the user's narrative style. Of particular value may be other captions that the user has previously generated for visual media, as the user is likely to apply a particular style to caption generation that may not be otherwise reflected in other types of publicly available language.

In order to build the personalized language model, the communications server may access public-facing language associated with the user specified in the account creation request 302. Accordingly, the communications server may generate a request 304 for the public-facing language. The request 304 may provide authentication information to the social networking server in order to authorize access to the user's information. In some embodiments, the authentication information may not be required, because the communications server requests only publicly-available information.

The social networking server may analyze the request 304 and return publicly-available language 306 from the user. The publicly-available language may include any language generated by the user that is made available to the general public or to the user's contacts (e.g., friends, a contacts list from a phone, etc.) at large. In some cases, the publicly-available language may include (if authorized by the user) language made available to a subset of the user's contacts, such as a group of friends. According to some embodiments, language made available to a group that has more than a threshold number of members may be included in the publicly-available language.

The publicly-available language may exclude one-on-one and some group communications (e.g., communications with less than a predetermined number of people). For example, private messages, posts shared with only a relatively small group of users, and other similar messages may be excluded from consideration.

Figure 4A:
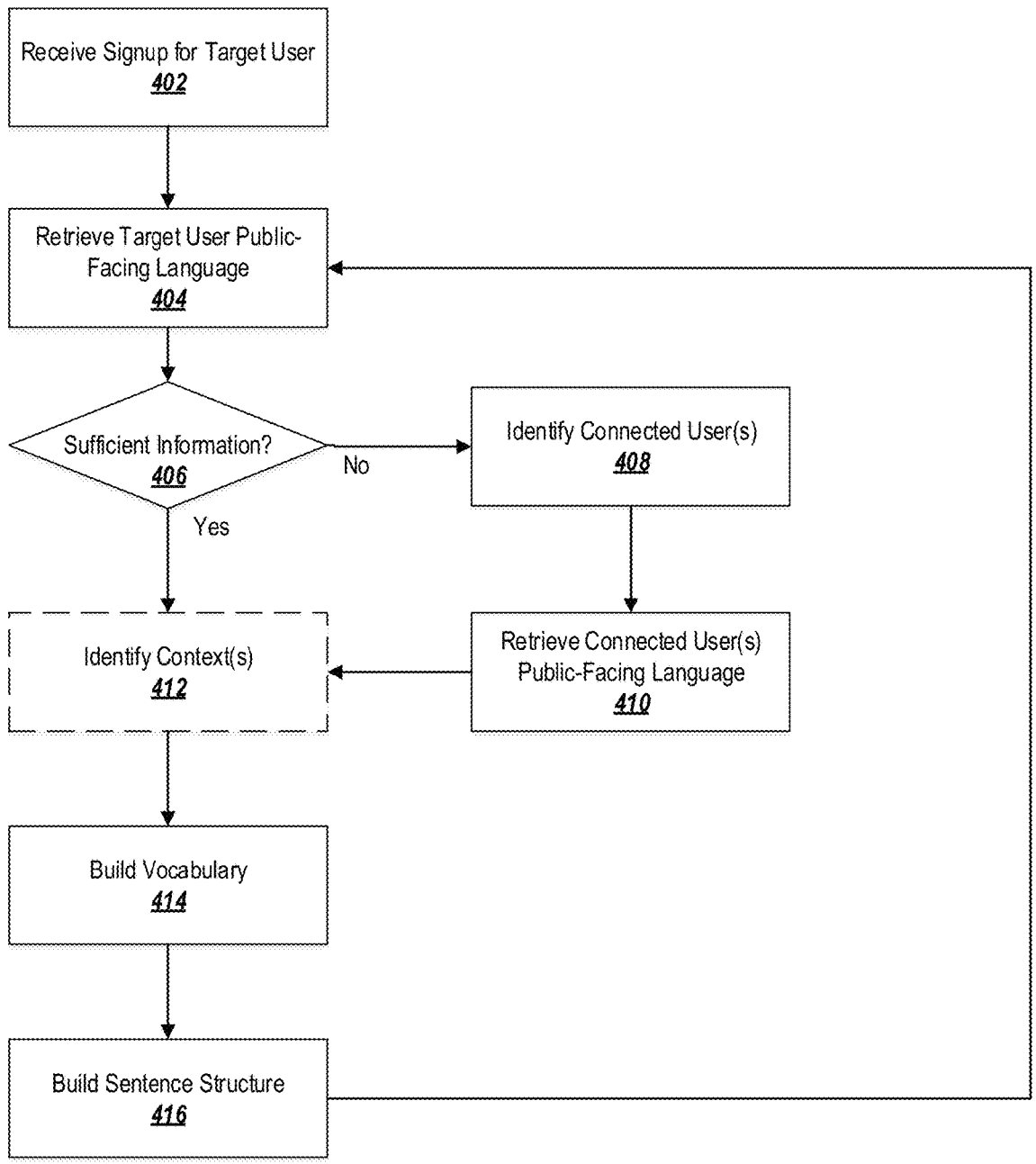
FIG. 4A depicts a flowchart of an exemplary technique for training a personal language model.
Figure 4B:
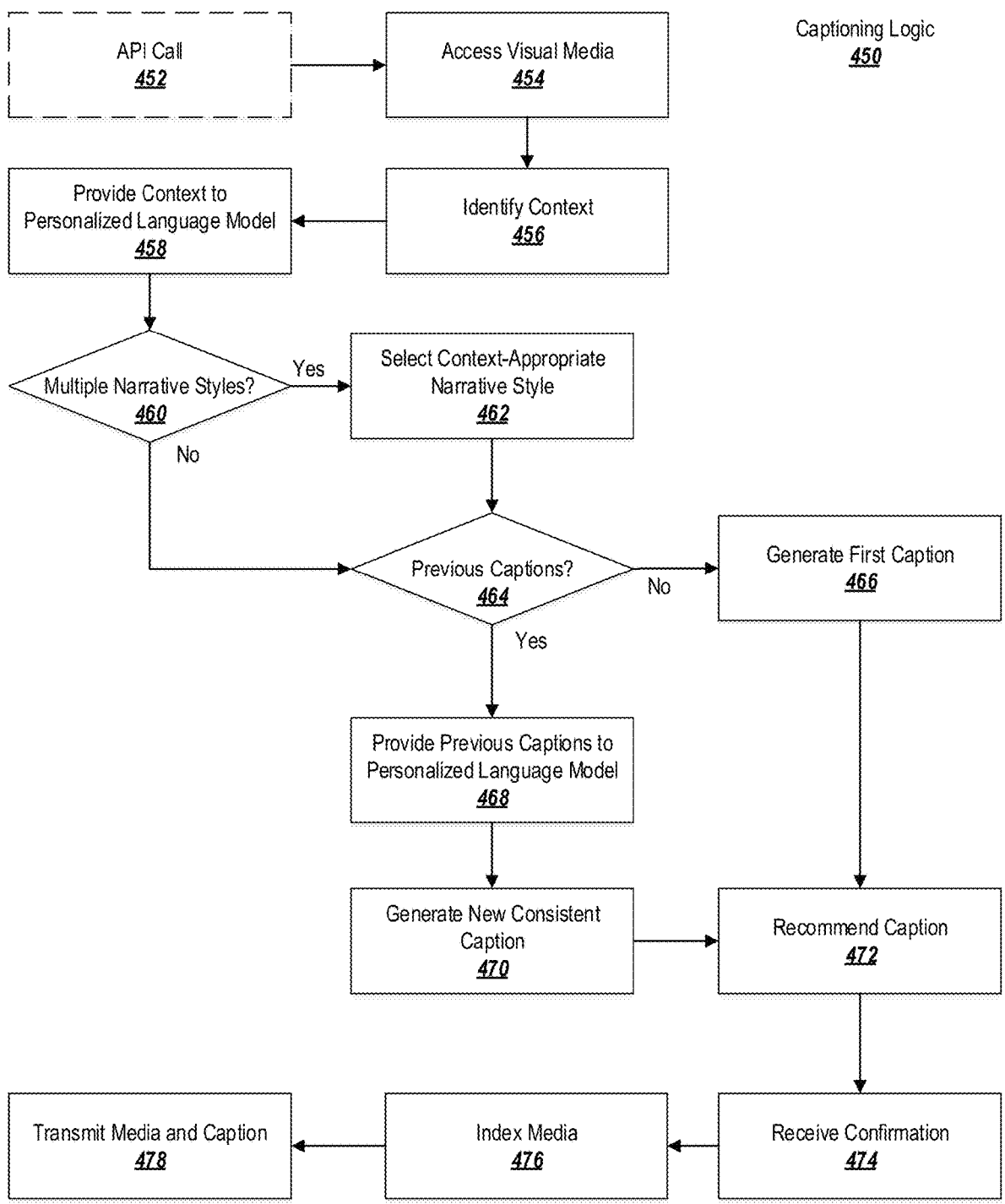
FIG. 4B depicts a flowchart of an exemplary technique for automatically generating a caption.

Using the public-facing language 306, the communications server may build a personalized language model, as described in more detail in connection with FIG. 4A. The communications server may periodically issue new requests 304 for recent public-facing language, and may receive new public-facing language 306 in response. The communications server may update the personalized language model using the new public-facing language 306.

At block 308, the sending client may transmit visual media 308 to the communications server for analysis and auto-captioning. Optionally, the sending client may transmit audio data 310, and any other suitable information (e.g., metadata, sensor information, etc.) from which a context may be identified. The communications server may analyze the visual media 308 and/or the audio/other data 310 to identify a context of the visual media 308, as described in more detail in connection with FIG. 4B.

The communications server may provide the identified context to the personalized language model, which may use the context to generate a description of the visual media 308. The communications server may transmit the description, as a proposed caption 312, to the sending client. Alternatively, the personalized language model may be configured to generate multiple candidate captions, and suggest the candidate captions to the sending client as different selectable options.

The user may review the proposed caption(s) and may confirm that the caption should be used or may reject the caption. Optionally, the communications server may be configured to provide an option to generate one or more new captions, which may be generated by applying a modification or different weights/probabilities in the personalized language model. Still further, the user may be empowered to edit the proposed caption through an interface at the sending client. As a result, the confirmation, rejection, new request, and/or edits 314 may be transmitted to the communications server.

Alternatively, the communications server may automatically apply the generated caption (potentially notifying the user that the caption is being applied and/or the content of the caption). In such embodiments, an option may be provided to allow the user to cancel or delete the caption, or to modify the caption once applied.

As an alternative to the information exchange in 308-314, the visual media may be processed locally at the sending client in order to generate a context. The context may then be sent to the communications server to generate a caption based on the context. Still further, the personalized language model may be hosted at the sending client, so that the caption may be automatically generated entirely at the sending client.

Once the caption is agreed to, the communications server may transmit the visual media 316 to a visual media recipient. If the visual media 308 was transmitted with audio data 310, the communications server may combine the visual media 308 with the audio data 310 to generate audiovisual data. The visual media 316 may be accompanied by metadata 318, which may include the generated caption for display by the visual media recipient.

The visual media recipient may be, for example, a broadcast server, a messaging server, a third-party server such as a news server, an individual receiving client device, a group of receiving client devices, etc. The visual media recipient may be the same as, or may be integrated with, the communications server and/or the social networking server.

Next, logic 400 for generating and applying a personalized language model is described in connection with FIG. 4A.

At block 402, the system may receive a signup request for a target user. The signup request may identify the target user using an identifier, which may be the same as the target user's username for a social networking or messaging service. The signup request may optionally include authentication or authorization information for the target user, such as authentication credentials for the social networking service.

The signup request may be received from a sending client, a third-party server, or some other device. The signup request may be received at a communications server, social networking server, or some other device configured to provide an automatic description/caption generation service. The signup request may be made as part of an API call.

At block 404, the system may retrieve public-facing language relating to the target user. As noted above, the public-facing language may be retrieved from a social networking service. The public-facing language may be retrieved as part of an API call to the social networking service (or another service). Alternatively or in addition, the public-facing language may be retrieved from a third-party service, a visual media sharing service, or from another type of service with which the target user is associated.

For example, if the user requesting to sign up with the auto-captioning service is a news organization, public-facing language may be retrieved from news stories published by the news organization (e.g., as accessed through the news organization's website or internal servers). Optionally, representative target language may be provided as part of the signup request and may be used as a supplement to, or in place of, other public-facing language associated with the target user.

The public-facing language may include language generated by the target user, but may exclude automatically generated language. For example, if the user has been using an auto-captioning service in the past, previous machine-generated captions may be excluded from consideration. In some embodiments, machine-generated captions may be included in the analysis (e.g., at a reduced weight) if extrinsic evidence indicates that the target user approves of the automatically-generated caption. For example, the user may be permitted to rate captions based on how closely the captions resemble the user's narrative style. Alternatively or in addition, if a caption has not been edited or has been edited only lightly by the user, and the caption has received a relatively high level of engagement among the user's contacts, this may be evidence that the caption accurately reflects the user's narrative style. Similarly, an automatically-generated caption that has been heavily edited by the user may provide multiple pieces of information: the original machine-generated caption may indicate a style that is inconsistent with the user's narrative style, while the edited caption may reflect the user's narrative style. The changes between the original and the edited caption may be analyzed to determine the user's narrative preferences.

Machine-generated captions may be identified by the presence of, e.g., a machine-generated flag identifying that the caption was generated by a machine. Alternatively or in addition, the caption may be analyzed to determine a likelihood that the caption was generated by a machine. Captions above a threshold likelihood level may be excluded from consideration.

The social networking server may return all of the user's publicly available language. Alternatively, the social networking server may return only a subset of the user's publicly available information (e.g., a predetermined amount of information or number of captions, the n most-recent publicly-available content items, or the content items generated within a predetermined period of time, such as in the past month).

In some embodiments, the social networking server may analyze the publicly available language based on one more metrics, and return the publicly available language that best matches the metrics. One example of such a metric is engagement with a social networking item. Engagement may include any type of interaction with the item, such as liking or otherwise reacting to a social network post, commenting on a post, etc. The most-engaged-with items (e.g. captions for the most-engaged with posted visual media) may be returned to the system for use in training the personal language model.

At block 406, the system may determine whether sufficient public-facing language has been returned in order to be able to suitably train a personalized language model. For example, the system may require a certain minimum number of content items or captions, or a certain minimum number of words or sentences, in order to train the language model. The system may also assign a quality score to the received public-facing language, indicating the language's suitability for caption generation. For example, a reasonably detailed user-generated caption may receive a high quality score, whereas a brief (e.g., few words) caption may receive a low quality score. A caption may receive a higher quality score than a comment or a post. If insufficient high-quality data was received, then the system may determine that sufficient information has not yet been received.

In some embodiments, the language model may generate one or more training captions based on predetermined contexts and may output a confidence score indicating a level of confidence that the personalized language model has output a reasonable caption. The confidence score may be determined based on one or more metrics, such as whether the caption makes grammatical sense, whether the personalized language model was able to find suitable user-specific vocabulary, whether the system was able to identify a suitable user-specific sentence structure, etc. If the confidence score for one or more of the training captions is below a predetermined threshold, then the system may determine that sufficient information has not yet been received.

If the system has not received sufficient public-facing language related to the target user, the system may supplement the target user's public facing language with other language likely to be similar to language that would be employed by the target user (or the personalized language model may be built entirely with such language). For example, a target user is likely to have a similar speaking style as compared to their close friends; accordingly, language from the target user's close friends may be employed to build he personalized language model for the target user.

Therefore, if the determination at block 406 is "no" (i.e., sufficient information has not been received), then processing may proceed to block 408. At block 408, the system may identify one or more connected users that are closely associated with the target user (e.g., the users for whom the target user has the highest affinity in the social network, as determined by an affinity score or some other affinity metric). A predetermined number of such closely associated users may be selected and their public-facing language may be retrieved. At block 410, the system may retrieve the connected user's public-facing information in a manner similar to that described in connection with block 404.

Alternatively or in addition, the system may retrieve the public-facing language from the next-highest ranked user (e.g., as determined by the affinity score) and determine whether adding this language to the already-retrieved language would result in sufficient information (step 406). The system may continue to retrieve more information from additional connected users until sufficient information has been retrieved.

Processing may then optionally proceed from block 410 to block 412. If the determination at block 406 is "yes" (i.e., sufficient information has been received), processing may optionally proceed directly to block 412.

At block 412, the system may identify one or more contexts in which the public-facing language is employed. For example, some target users may have different speaking styles when in different locations (e.g., home versus work), at different types of venues (e.g., at a sports bar, in a park, etc.), at different times (e.g., during the workday versus on a weekend) when certain people are present or not present with the target user (e.g., children, friends, parents). The system may identify one or more contexts associated with a unit of public-facing language, and may determine if sufficient information exists to generate a personalized language model (or a modification to a personalized language model) for the identified context. If not, a general personalized language model may be generated using the public-facing language. If so, the system may tag the unit of language with one or more contexts, and a personalized language model may be generated for each context. Alternatively or in addition, a general personalized language model may be generated and one or more modifications (e.g., changes to rules, probabilities, etc.) may be associated with the personalized language model for application when the identified contexts arise.

Even if different personalized language models are generated for different contexts, a general personalized language model may also be generated, or one of the personalized language models may be set as a default model, in case a new context arises in connection with visual media for which no existing specialized personalized language model exists.

Processing may then proceed to block 414 where the system begins to build or modify a personalized language model.

The personalized language model may reflect the word use of a target user as defined by the user's vocabulary in the public-facing language. Accordingly, at block 414, the system may build a vocabulary associated with the target user. The vocabulary may include the words present in the public-facing language and may be associated with a probability based on the frequency of use of the words in the public-facing language. The vocabulary may be supplemented with additional words from a dictionary.

The vocabulary may be determined or may be supplemented by one or more custom dictionaries associated with the user. For example, the user's mobile device, word processing software, Internet browser, or another source may maintain one or more custom dictionaries associated with the user. The custom dictionaries may optionally be provided to the system in order to generate, augment, or modify the user-specific vocabulary.

The personalized language model may further reflect a sentence or phrase structure commonly employed by the target user (e.g., placement of nouns, verbs, adjectives, etc., rules regarding capitalization and grammar, rules regarding punctuation, preferred sentence or phrase length, number of words per sentence, length or complexity of words in a sentence or phrase and frequency of words at various complexities, etc.) Accordingly, at block 416 the system may create or modify one or more rules or probabilities relating to sentence or phrase construction.

The personalized language model may be provided with default rules of sentence construction. Such rules may be modified based on the user's public-facing language. For example, if the user routinely capitalizes or fails to capitalize words under certain circumstances, the rules regarding capitalization may be modified. If the user routinely applies punctuation in a certain way the punctuation rules may be modified, etc.

When building the personalized language model (e.g., at blocks 414 and 416), the system may assign different weights to different types of publicly-available language. For example, captions of visual media may be assigned a relatively higher weight as compared to other types of language, such as comments or posts, since users may have a different narrative style when generating captions as compared to when they are applying language in other contexts. Furthermore, recent publicly-available language may be weighed relatively more than older publicly-available language in order to accommodate changes in the user's narrative style over time.

Although the personalized language model has been described above as rules, probabilities, etc. that reflect the target user's preferred vocabulary and sentence structure, other types of personalized language models are contemplated within the scope of the present disclosure. Any model that accepts visual media or information associated with visual media and generates a description of the visual media in a narrative style of a target user may be considered a personalized language model.

After training the personalized language model, the system may wait a predetermined amount of time (e.g., one day, one week, one month, etc.), and processing may then return to block 404 to retrieve new public-facing language for the target user. The personalized language model may be rebuilt, or may be augmented, based on the new public-facing language. In this manner, the personalized language model may be updated as the user's narrative style evolves over time.

Next, application of the personalized language model is described in connection with the logic 450 depicted in FIG. 4B.

The system may optionally expose an API allowing for interaction with the auto-captioning process. The logic 450 may optionally start at block 452 by receiving an API call with a request to automatically caption visual media. The API call may identify or may provide the visual media and may identify a target user in whose narrative style the caption should be generated. The target user may be an individual, an organization, a business, etc. The visual media may be any suitable media, such as a photograph, a photo album, live video, non-live video, one or more frames from a video, etc. If the visual media is a video, then a portion of the video (e.g., a subset of frames or a timespan within the video) may be identified for captioning.

At block 454, the system may access visual media for auto-captioning. If the visual media was provided in the API call in block 452 (or otherwise provided directly to the system), the system may retrieve the visual media from local memory. If the visual media was identified in the API call (or otherwise), the system may retrieve the visual media from the identified location. The system may access the visual media locally or remotely (e.g., through a network).

At block 456, the system may identify one or more contexts associated with the visual media. The context(s) may be identified based on a number of factors. For example, metadata or other information associated with the visual media may be consulted to identify a location at which the visual media was captured, a time of capture, a user associated with the device on which the media was captured, etc. Sensor data associated with the visual media, such as GPS data, temperature data, clock data, accelerometer data, compass data, fitness sensor data, etc. may also be considered.

Furthermore, the visual media may be analyzed or processed to identify further information. Analyzing the visual media may include performing object and/or facial recognition on the visual media, analyzing audio data associated with the visual media, performing event detection, analyzing manually-applied tags, etc.

Still further, data relating to the target user may be analyzed to provide the context(s). For example, the user's check-in data on a social networking service, the user's calendar(s), activities of the user's contacts, etc. may be analyzed to determine if any of this information relates to the activities going on in the visual media.

Still further, third-party data may be analyzed to identify the context. The third-party data may include news sources, weather reports, trending social media topics, etc. For example, if a news source indicates the presence of an ongoing news story in the vicinity of the location at which the visual media was captured, or a social media trending topic references the location, then it may be that the user was attempting to capture the news story or topic in the visual media. If the news story or topic is corroborated by analysis of the visual media (e.g., object or facial recognition, analysis of audio, etc.), then the third-party data may be associated with the context.

Block 456 may result in one or more context tags being generated. The tags may describe the context of the visual media (e.g., "camping," "sports," "morning," "kids," etc.). Tags may be predetermined and selected from a list. Each tag may be associated with a confidence score indicating the likelihood that the tag accurately describes the media, as determined by the system generating the tags. The tags with the highest confidence scores, or each tag with a confidence score above a predetermined threshold, may be selected to describe the context(s) of the visual media.

The thus-determined context(s) (and an identifier of the target user) may be provided to the personalized language model at block 458.

At block 460, the system may determine if multiple different narrative styles are available for the user. For example, the system may determine if multiple personalized language models exist for the target user, or if a general personalized language model exists for the target user along with modifications based on the context.

Even if multiple narrative styles have been identified, it may be the case that the context identified at block 456 does not have a corresponding specialized personalized language model. In this case, or in the case that multiple narrative styles do not exist, processing may proceed directly to block 464. Otherwise (e.g., multiple narrative styles exist and at least one of the corresponding personalized language models matches the context identified at block 456), processing may proceed to block 462.

At block 462, the system may select one or more context-appropriate narrative styles. This may involve matching the context(s) identified in block 456 against different personalized language models in order to select the personalized language model most appropriate to the context of the visual media. If multiple contexts are identified and personalized language models exist for the multiple contexts, then the personalized language model associated with the highest-confidence context may be selected. Processing may then proceed to block 464.

At block 464, the system may determine whether the caption being generated is the first caption associated with the visual media (or other visual media associated with the visual media). For example, the visual media may be a photograph within a photo album; if other photos in the album have been previously captioned, then the determination at block 464 may be "yes." Similarly, the visual media may be a video, such as a live video. The video may be associated with multiple requests for captions (e.g., a new caption every x number of seconds, or every time a new event occurs in the video). If previous captions have bene generated for the video, then the determination at block 464 may be "yes." On the other hand, if the visual media is a standalone photo, the first photo in an album, or a video for which an initial caption is being generated, then the determination at block 464 may be "no."

If the determination at block 464 is "no" (i.e., previous captions have not been generated), then processing may proceed to block 466. At block 466, a first caption may be generated for the visual media. The caption may be generated by providing the context to the personalized language model of the users (or, if multiple different personalized language models exist for the target user, the specific language model identified at block 462), and the personalized language model may generate a description for the visual media in the target user's narrative style. To this end, the personalized language model may generate a description using the sentence structure rules identified for the user (block 416 of FIG. 4A). The model may select words consistent with the user's vocabulary (block 414 of FIG. 4A).

The personalized language model may attempt to mimic previous captions generated by the user in similar contexts;

to that end, the personalized language model may select a representative caption generated by the target user, and may modify the caption using the rules and probabilities of the model and the context provided in block 458 to describe the new visual media.

On the other hand, if the determination at block 464 was "yes" (i.e., previous captions relating to the visual media have been generated), then processing may proceed to block 468. At block 468, the system may retrieve the previous captions and provide the previous captions to the personalized language model.

The personalized language model may be configured to keep related captions consistent with each other, or to tell a coherent narrative story when moving between related captions. To this end, at block 470 the model may consider both the context(s) provided in block 458 and the previous captions when generating a new caption. Caption generation at block 470 may generally proceed as described in connection with block 466, with some modification to accommodate the previous captions.

For example, contextual information (relating to the current visual media) that is inconsistent with previous captions may be excluded from consideration by the personalized language model. Contextual information may be inconsistent when one of the contextual tags generated in block 456 is inconsistent with tags used to generate previous visual media (e.g., the tag "car" when previous tags have been focused on camping and the outdoors).

Furthermore, the personalized language model may be configured to provide continuity between captions by maintaining focus on emphasized contextual tags from previous captions. For instance, if the analysis that generated a previous caption focused on a particular contextual tag (e.g., a tag that was generated with a high level of confidence), and the contextual tag is still present in connection with the analysis of the current visual media, then the contextual tag may continue to be emphasized even if other tags are associated with higher levels of confidence in the current analysis.

Continuity may also be provided my maintaining consistent vocabulary and/or sentence structures between related captions. Thus, the weightings for vocabulary and sentence structures may be temporarily modified when generating additional captions for related visual media.

However, the personalized language model may be configured to shift focus and incorporate otherwise inconsistent information if contextual evidence indicates that the user wishes to change focus. For example, if the user emphasizes an otherwise inconsistent object (e.g., by pointing the camera at the object or focusing on the object, or by making a note of the object in associated audio data), this may indicate that the narrative described in the captions should be shifted to focus on the object.

Optionally, at block 466 and/or block 470, the system may generate the captions without applying a personalized language model. For example, the system may generate the captions by applying a general-purpose language model. In some cases, the system may choose between different types of general-purpose language models (e.g., a general-purpose language model for individuals, a general-purpose language model for news organizations, a general-purpose language model for magazines, etc.).

At block 472, the system may recommend the caption to the user of the originating device. For example, a proposed caption may be transmitted to the originating device for approval by the user. In another embodiment, multiple captions may be generated at blocks 466 and 470, and the user may be prompted to choose between the captions.

At block 474, the system may receive a confirmation that the caption should be applied, a rejection of the caption, or edits to the caption. If the caption is approved, with or without edits, processing may proceed to block 476. If the caption is rejected, then processing may return to block 466 or 470, as appropriate, and a new caption may be generated. Weightings in the personalized language model may be temporarily modified, or different contextual tags may be emphasized, in order to generate a different caption. Alternatively, the user may be prompted to provide their own caption, or may be permitted to post the visual media without a caption.

At block 476, the system may index the visual media using the caption. The contextual tags used to generate the caption may be associated with the visual media. Such tags or other caption-related information may be used to index the visual media for use by, e.g., a search engine or an algorithm for selecting visual media for presentation or surfacing to other users. For instance, when a social networking service determines which content items to surface to users in a news feed, the system may consider the index information applied at block 476 to identify visual media that may be of interest to other users of the social network.

At block 478, the system may transmit the visual media and the caption to a recipient device. The recipient device may be, for example, a social networking server (to be posted, e.g., to the target user's account), a broadcast server, a messaging server, a communications server, etc. The visual media may be displayed or transmitted through the recipient device in connection with the caption.

Some or all of the blocks described in connection with FIG. 4B may be performed by a special-purpose server designated for performing auto-captioning. Alternatively or in addition, some or all of the blocks may be performed at a client device associated with the target user, a social networking server, a communications server, or at another location.

Communication System Overview

Figure 5A:
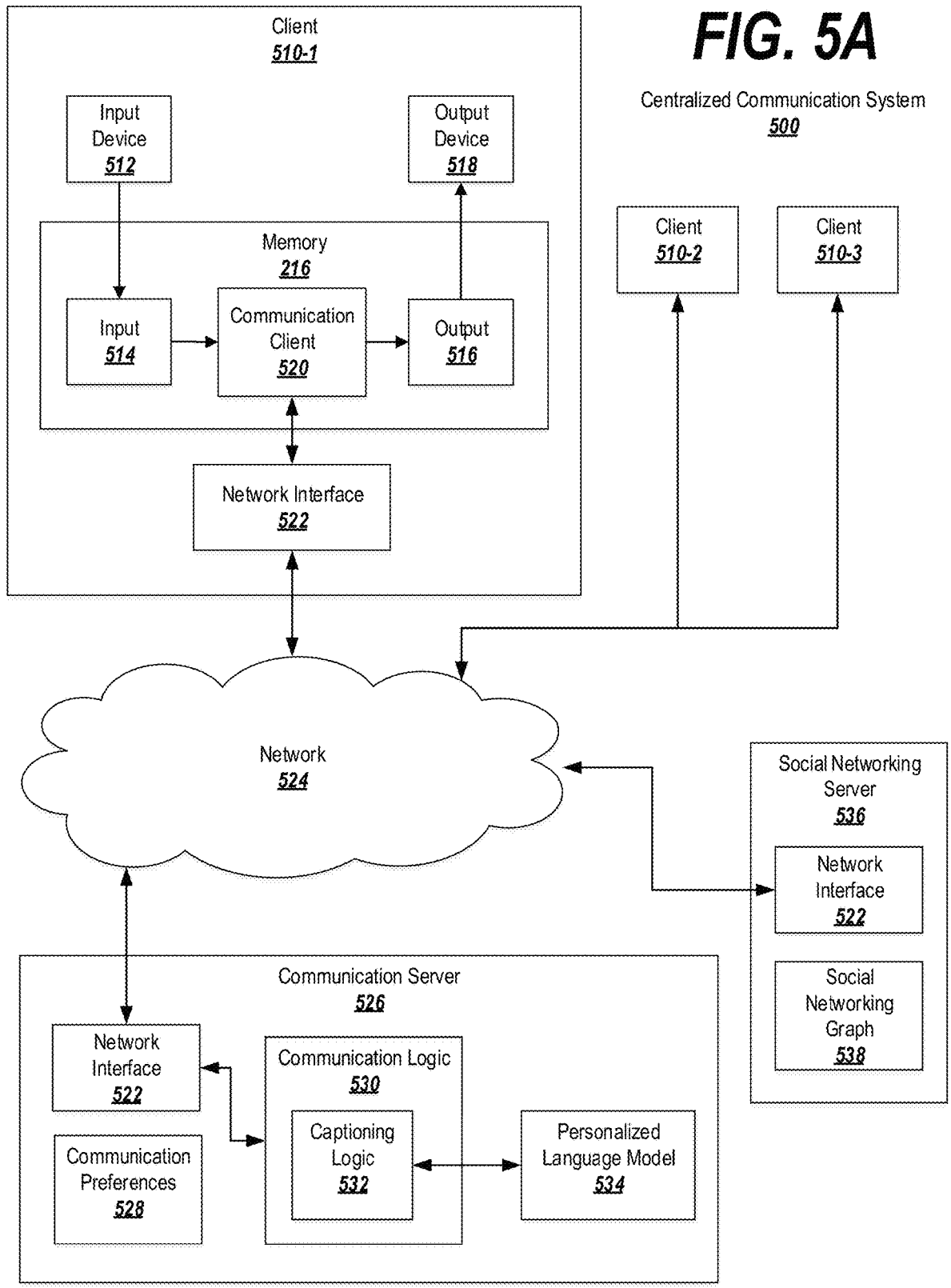
FIG. 5A is a block diagram providing an overview of a system including an exemplary centralized communications service.
Figure 5B:
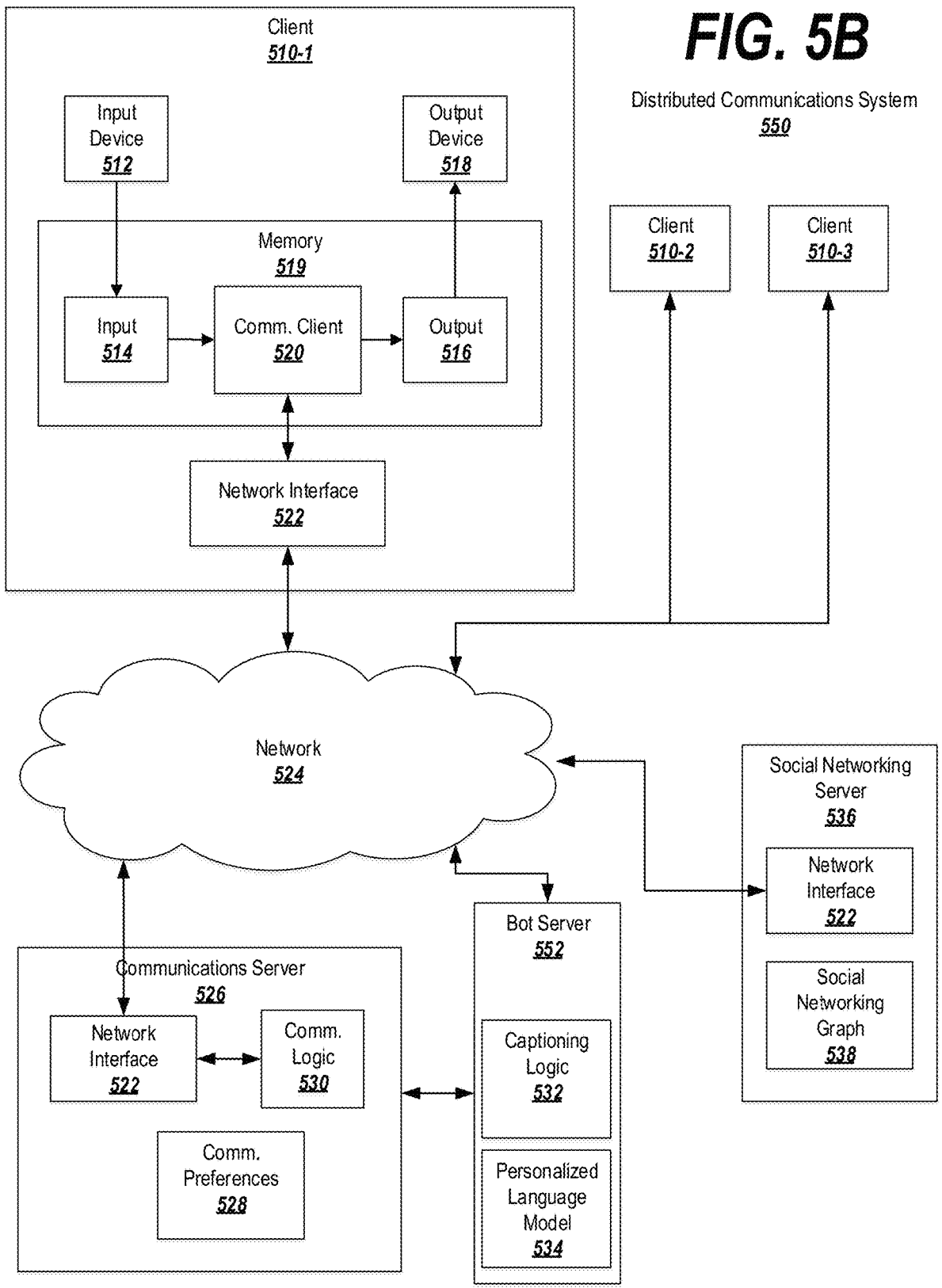
FIG. 5B is a block diagram providing an overview of a system including an exemplary distributed communications service.
Figure 5C:
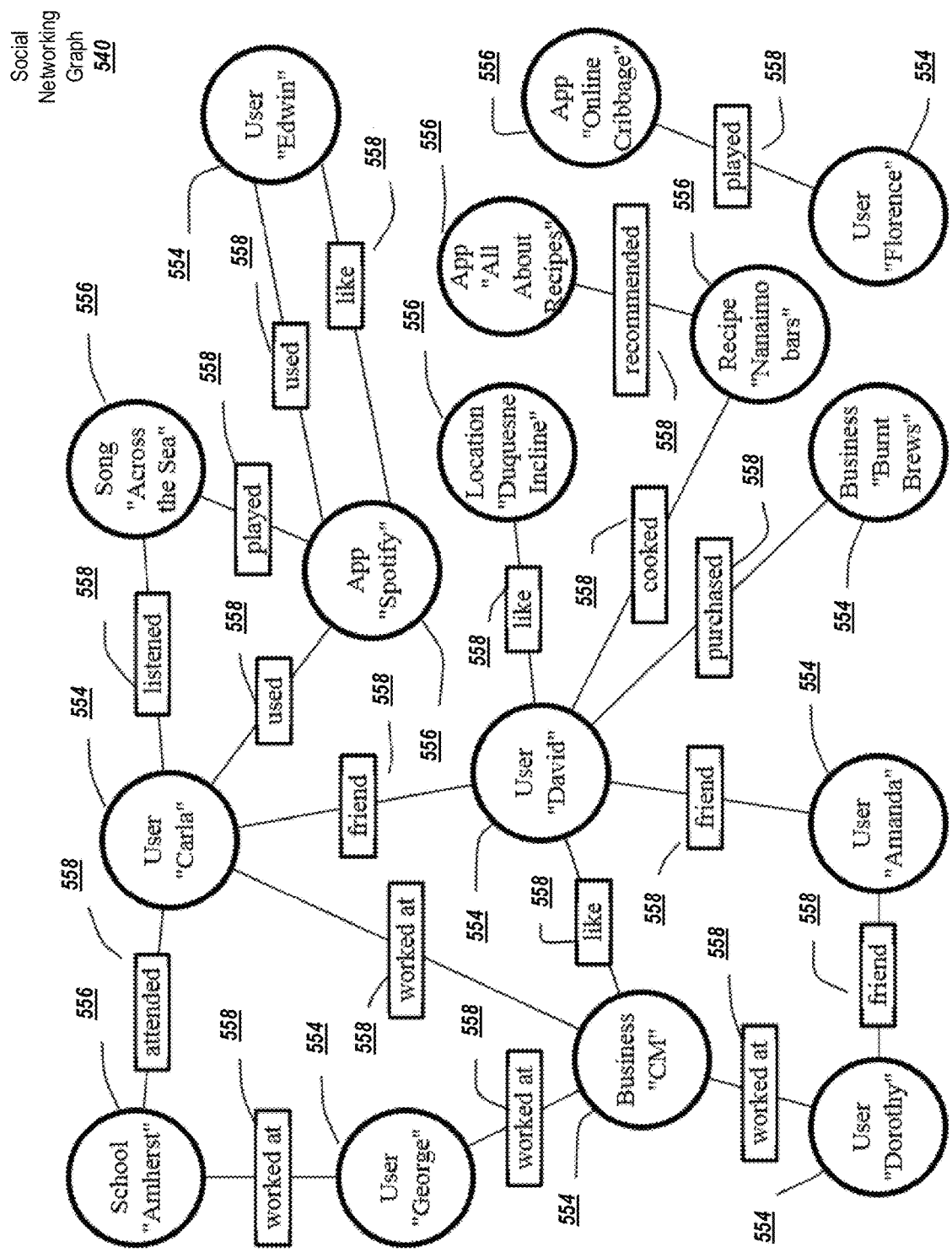
FIG. 5C depicts the social networking graph of FIGS. 8A-8B in more detail.

These examples may be implemented by a messaging system that is provided either locally, at a client device, or remotely (e.g., at a remote server). FIGS. 5A-5C depict various examples of messaging systems, and are discussed in more detail below.

FIG. 5A depicts an exemplary centralized communication system 500, in which functionality for recognizing productive intent and generating a list of suggested recipients is integrated into a messaging server. The centralized system 500 may implement some or all of the structure and/or operations of a messaging service in a single computing entity, such as entirely within a single centralized server device 526.

The communication system 500 may include a computer-implemented system having software applications that include one or more components. Although the communication system 500 shown in FIG. 5A has a limited number of elements in a certain topology, the communication system 500 may include more or fewer elements in alternate topologies.

A messaging service 500 may be generally arranged to receive, store, and deliver messages. The messaging service 500 may store messages while messaging clients 520, such as may execute on client devices 510, are offline and deliver the messages once the messaging clients are available.

A client device 510 may transmit messages addressed to a recipient user, user account, or other identifier resolving to a receiving client device 510. In exemplary embodiments, each of the client devices 510 and their respective messaging clients 520 are associated with a particular user or users of the messaging service 500. In some embodiments, the client devices 510 may be cellular devices such as smartphones and may be identified to the messaging service 500 based on a phone number associated with each of the client devices 510. In some embodiments, each messaging client may be associated with a user account registered with the messaging service 500. In general, each messaging client may be addressed through various techniques for the reception of messages. While in some embodiments the client devices 510 may be cellular devices, in other embodiments one or more of the client devices 510 may be personal computers, tablet devices, any other form of computing device.

The client 510 may include one or more input devices 512 and one or more output devices 518. The input devices 512 may include, for example, microphones, keyboards, cameras, electronic pens, touch screens, and other devices for receiving inputs including message data, requests, commands, user interface interactions, selections, and other types of input. The output devices 518 may include a speaker, a display device such as a monitor or touch screen, and other devices for presenting an interface to the communication system 500.

The client 510 may include a memory 519, which may be a non-transitory computer readable storage medium, such as one or a combination of a hard drive, solid state drive, flash storage, read only memory, or random access memory. The memory 519 may a representation of an input 514 and/or a representation of an output 516, as well as one or more applications. For example, the memory 519 may store a messaging client 520 and/or a social networking client that allows a user to interact with a social networking service.

The input 514 may be textual, such as in the case where the input device 212 is a keyboard. Alternatively, the input 514 may be an audio recording, such as in the case where the input device 512 is a microphone. Accordingly, the input 514 may be subjected to automatic speech recognition (ASR) logic in order to transform the audio recording to text that is processable by the communication system 500. The ASR logic may be located at the client device 510 (so that the audio recording is processed locally by the client 510 and corresponding text is transmitted to the communication server 526), or may be located remotely at the communication server 526 (in which case, the audio recording may be transmitted to the communication server 526 and the communication server 526 may process the audio into text). Other combinations are also possible—for example, if the input device 512 is a touch pad or electronic pen, the input 514 may be in the form of handwriting, which may be subjected to handwriting or optical character recognition analysis logic in order to transform the input 512 into processable text.

The client 510 may be provided with a network interface 522 for communicating with a network 524, such as the Internet. The network interface 522 may transmit the input 512 in a format and/or using a protocol compatible with the network 524 and may receive a corresponding output 516 from the network 524.

The network interface 522 may communicate through the network 524 to a communication server 526. The communication server 526 may be operative to receive, store, and forward messages between messaging clients.

The communication server 526 may include a network interface 522, communication preferences 528, and communication logic 530. The communication preferences 528 may include one or more privacy settings for one or more users and/or message threads. For example, the communication preferences 528 may include one or more settings, including default settings, for the logic described herein.

The communication logic 530 may include topic captioning logic 532 that is operable to apply a personalized language model 534 to automatically generate captions for visual media.

In some embodiments, messages may be sent peer-to-peer between users without the use of intervening server devices such as may implement the communication service 500. In these embodiments, the communication logic 530, including the captioning logic 532, and the personalized language model 534, may reside on the client devices 510.

The network interface 522 of the client 510 and/or the communication server 526 may also be used to communicate through the network 524 with a social networking server 536. The social networking server 536 may include or may interact with a social networking graph 538 that defines connections in a social network. Furthermore, the communication server 526 may connect to the social networking server 536 for various purposes, such as retrieving connection information, messaging history, event details, etc. from the social network.

A user of the client 510 may be an individual (human user), an entity (e.g., an enterprise, business, or third-party application), or a group (e.g., of individuals or entities) that interacts or communicates with or over the social networking server 536. The social-networking server 536 may be a network-addressable computing system hosting an online social network. The social networking server 536 may generate, store, receive, and send social-networking data, such as, for example, user-profile data, concept-profile data, social-graph information, or other suitable data related to the online social network. The social networking server 536 may be accessed by the other components of the network environment either directly or via the network 524.

The social networking server 536 may include an authorization server (or other suitable component(s)) that allows users to opt in to or opt out of having their actions logged by social-networking server 536 or shared with other systems (e.g., third-party systems, such as the communication server 526), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 536 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 538. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 536 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social networking server 536 may send a request to the data store for the object. The request may identify the user associated with the request. The requested data object may only be sent to the user (or a client system 510 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social-networking server 536 or explicit connections of a user to a node, object, entity, brand, or page on social networking server 536. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for a Soda Company?"); lightweight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The centralized embodiment depicted in FIG. 5A may be well-suited to deployment as a new system or as an upgrade to an existing system, because the logic for pivoting to a group conversation (e.g., the topic subscription logic 532 and/or content delivery logic 534) are incorporated into the communication server 526. In contrast, FIG. 5B depicts an exemplary distributed communication system 550, in which functionality for creating and managing subscriptions and handling content delivery is distributed and remotely accessible from the messaging server. Examples of a distributed system 550 include a client-server architecture, a 3-tier architecture, an N-tier architecture, a tightly-coupled or clustered architecture, a peer-to-peer architecture, a master-slave architecture, a shared database architecture, and other types of distributed systems.

Many of the components depicted in FIG. 5B are identical to those in FIG. 5A, and a description of these elements is not repeated here for the sake of brevity. The primary difference between the centralized embodiment and the distributed embodiment is the addition of a separate captioning server 552, which hosts the captioning logic 532 and the personalized language model 534. The captioning server 552 may be distinct from the communication server 526 but may communicate with the communication server 526, either directly or through the network 524, to provide the functionality of the captioning logic 532 and the personalized language model 534 to the communication server 526.

The embodiment depicted in FIG. 5B may be particularly well suited to allow exemplary embodiments to be deployed alongside existing messaging systems, for example when it is difficult or undesirable to replace an existing messaging server. Additionally, in some cases the communication server 526 may have limited resources (e.g. processing or memory resources) that limit or preclude the addition of the additional pivot functionality. In such situations, the capabilities described herein may still be provided through the separate captioning server 552.

FIG. 5C illustrates an example of a social networking graph 538. In exemplary embodiments, a social networking service may store one or more social graphs 538 in one or more data stores as a social graph data structure via the social networking service.

The social graph 538 may include multiple nodes, such as user nodes 554 and concept nodes 556. The social graph 228 may furthermore include edges 558 connecting the nodes. The nodes and edges of social graph 228 may be stored as data objects, for example, in a data store (such as a social-graph database). Such a data store may include one or more searchable or queryable indexes of nodes or edges of social graph 228.

The social graph 538 may be accessed by a social-networking server 226, client system 210, third-party system (e.g., the translation server 224), or any other approved system or device for suitable applications.

A user node 554 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 554 corresponding to the user, and store the user node 30 in one or more data stores. Users and user nodes 554 described herein may, where appropriate, refer to registered users and user nodes 554 associated with registered users. In addition or as an alternative, users and user nodes 554 described herein may, where appropriate, refer to users that have not registered with the social-networking system. In particular embodiments, a user node 554 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 554 may be associated with one or more data objects corresponding to information associated with a user. In particular embodiments, a user node 554 may correspond to one or more webpages. A user node 554 may be associated with a unique user identifier for the user in the social-networking system.

In particular embodiments, a concept node 556 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 556 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 556 may be associated with one or more data objects corresponding to information associated with concept node 556. In particular embodiments, a concept node 556 may correspond to one or more webpages.

In particular embodiments, a node in social graph 538 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 556. Profile pages may be viewable by all or a selected subset of other users. As an example and not by way of limitation, a user node 554 may have a corresponding user-profile page in which the corresponding user may add content, make declarations, or otherwise express himself or herself. A business page such as business page 205 may comprise a user-profile page for a commerce entity. As another example and not by way of limitation, a concept node 556 may have a corresponding concept-profile page in which one or more users may add content, make declarations, or express themselves, particularly in relation to the concept corresponding to concept node 556.

In particular embodiments, a concept node 556 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 554 corresponding to the user and a concept node 556 corresponding to the third-party webpage or resource and store edge 558 in one or more data stores.

In particular embodiments, a pair of nodes in social graph 538 may be connected to each other by one or more edges 558. An edge 558 connecting a pair of nodes may represent a relationship between the pair of nodes. In particular embodiments, an edge 558 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 558 connecting the first user's user node 554 to the second user's user node 554 in social graph 538 and store edge 558 as social-graph information in one or more data stores. In the example of FIG. 5C, social graph 538 includes an edge 558 indicating a friend relation between user nodes 554 of user "Amanda" and user "Dorothy." Although this disclosure describes or illustrates particular edges 558 with particular attributes connecting particular user nodes 554, this disclosure contemplates any suitable edges 558 with any suitable attributes connecting user nodes 554. As an example and not by way of limitation, an edge 558 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 538 by one or more edges 558.

In particular embodiments, an edge 558 between a user node 554 and a concept node 556 may represent a particular action or activity performed by a user associated with user node 554 toward a concept associated with a concept node 556. As an example and not by way of limitation, as illustrated in FIG. 5C, a user may "like," "attended," "played," "listened," "cooked," "worked at," or "watched" a concept, each of which may correspond to a edge type or subtype. A concept-profile page corresponding to a concept node 556 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (Music Service, which is an online music application). In this case, the social-networking system may create a "listened" edge 558 and a "used" edge (as illustrated in FIG. 5C) between user nodes 554 corresponding to the user and concept nodes 556 corresponding to the song and application to indicate that the user listened to the song and used the application. Moreover, the social-networking system may create a "played" edge 558 (as illustrated in FIG. 5C) between concept nodes 556 corresponding to the song and the application to indicate that the particular song was played by the particular application. In this case, "played" edge 558 corresponds to an action performed by an external application (Music Service) on an external audio file (the song "Across the Sea"). Although this disclosure describes particular edges 558 with particular attributes connecting user nodes 554 and concept nodes 556, this disclosure contemplates any suitable edges 558 with any suitable attributes connecting user nodes 554 and concept nodes 556. Moreover, although this disclosure describes edges between a user node 554 and a concept node 556 representing a single relationship, this disclosure contemplates edges between a user node 554 and a concept node 556 representing one or more relationships. As an example and not by way of limitation, an edge 558 may represent both that a user likes and has used at a particular concept. Alternatively, another edge 558 may represent each type of relationship (or multiples of a single relationship) between a user node 554 and a concept node 556 (as illustrated in FIG. 5C between user node 554 for user "Edwin" and concept node 556 for "Music Service").

In particular embodiments, the social-networking system may create an edge 558 between a user node 554 and a concept node 556 in social graph 538. As an example and not by way of limitation, a user viewing a concept-profile page (such as, for example, by using a web browser or a special-purpose application hosted by the user's client system) may indicate that he or she likes the concept represented by the concept node 556 by clicking or selecting a "Like" icon, which may cause the user's client system to send to the social-networking system a message indicating the user's liking of the concept associated with the concept-profile page. In response to the message, the social-networking system may create an edge 558 between user node 554 associated with the user and concept node 556, as illustrated by "like" edge 558 between the user and concept node 556. In particular embodiments, the social-networking system may store an edge 558 in one or more data stores. In particular embodiments, an edge 558 may be automatically formed by the social-networking system in response to a particular user action. As an example and not by way of limitation, if a first user uploads a picture, watches a movie, or listens to a song, an edge 558 may be formed between user node 554 corresponding to the first user and concept nodes 556 corresponding to those concepts. Although this disclosure describes forming particular edges 558 in particular manners, this disclosure contemplates forming any suitable edges 558 in any suitable manner.

The social graph 538 may further comprise a plurality of product nodes. Product nodes may represent particular products that may be associated with a particular business. A business may provide a product catalog to a consumer-to-business service and the consumer-to-business service may therefore represent each of the products within the product in the social graph 538 with each product being in a distinct product node. A product node may comprise information relating to the product, such as pricing information, descriptive information, manufacturer information, availability information, and other relevant information. For example, each of the items on a menu for a restaurant may be represented within the social graph 538 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 538. The information for a product node may be manipulated by the social-networking system as a product object that encapsulates information regarding the referenced product.

As such, the social graph 538 may be used to infer shared interests, shared experiences, or other shared or common attributes of two or more users of a social-networking system. For instance, two or more users each having an edge to a common business, product, media item, institution, or other entity represented in the social graph 538 may indicate a shared relationship with that entity, which may be used to suggest customization of a use of a social-networking system, including a messaging system, for one or more users.

The embodiments described above may be performed by a messaging architecture, an example of which is next described with reference to FIG. 6.

Messaging Architecture

Figure 6:
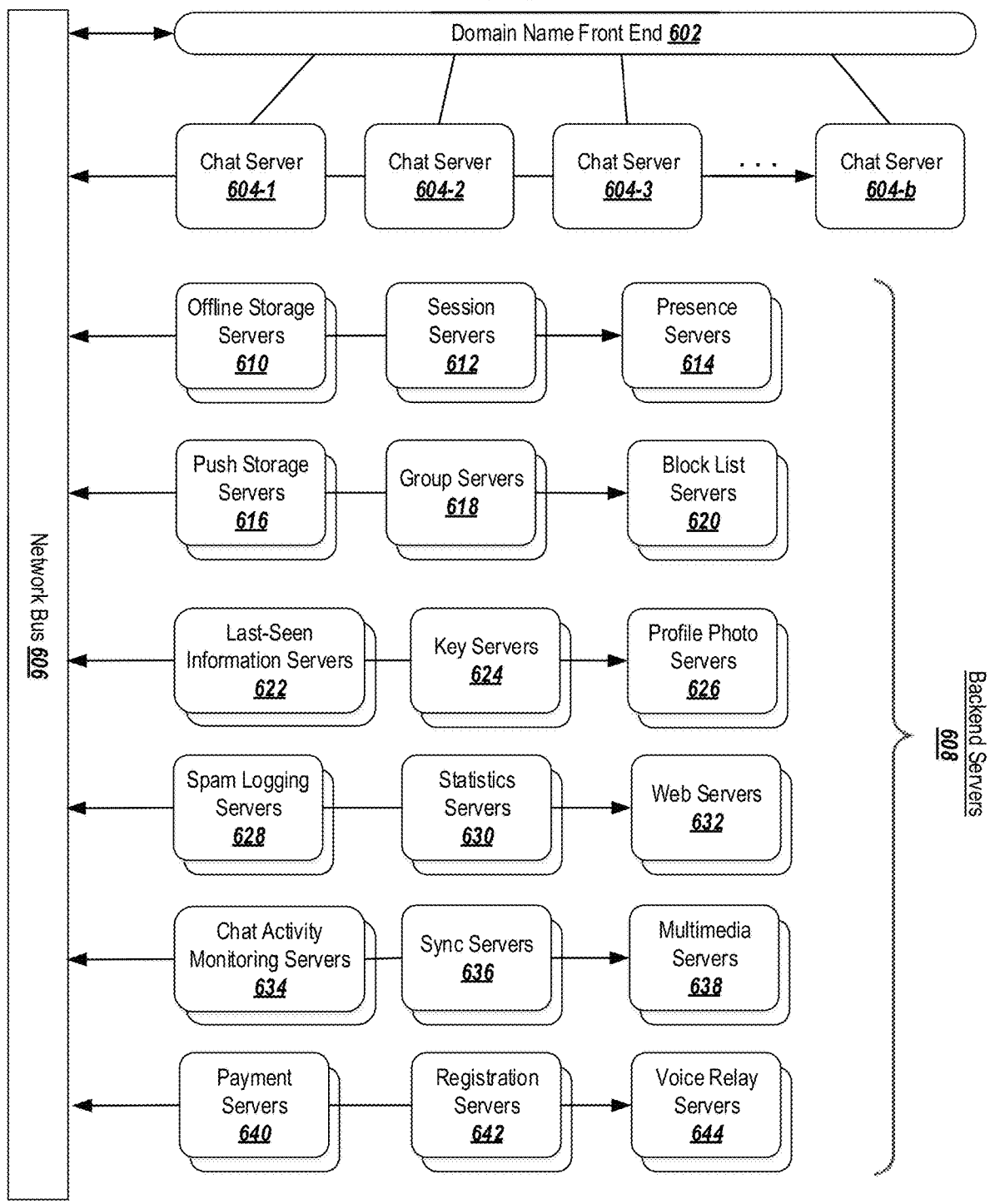
FIG. 6 is a block diagram depicting an example of a system for a messaging service.

FIG. 6 illustrates an embodiment of a plurality of servers implementing various functions of a messaging service 600.

It will be appreciated that different distributions of work and functions may be used in various embodiments of a messaging service 600.

The messaging service 600 may comprise a domain name front end 602. The domain name front end 602 may be assigned one or more domain names associated with the messaging service 600 in a domain name system (DNS). The domain name front end 602 may receive incoming connections and distribute the connections to servers providing various messaging services.

The messaging service 602 may comprise one or more chat servers 604. The chat servers 604 may comprise front-end servers for receiving and transmitting user-to-user messaging updates such as chat messages. Incoming connections may be assigned to the chat servers 604 by the domain name front end 602 based on workload balancing.

The messaging service 600 may comprise backend servers 608. The backend servers 608 may perform specialized tasks in the support of the chat operations of the front-end chat servers 604. A plurality of different types of backend servers 608 may be used. It will be appreciated that the assignment of types of tasks to different backend serves 608 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 600 may comprise one or more offline storage servers 610. The one or more offline storage servers 610 may store messaging content for currently-offline messaging clients in hold for when the messaging clients reconnect.

The messaging service 600 may comprise one or more sessions servers 612. The one or more session servers 612 may maintain session state of connected messaging clients.

The messaging service 600 may comprise one or more presence servers 614. The one or more presence servers 614 may maintain presence information for the messaging service 600. Presence information may correspond to user-specific information indicating whether or not a given user has an online messaging client and is available for chatting, has an online messaging client but is currently away from it, does not have an online messaging client, and any other presence state.

The messaging service 600 may comprise one or more push storage servers 616. The one or more push storage servers 616 may cache push requests and transmit the push requests to messaging clients. Push requests may be used to wake messaging clients, to notify messaging clients that a messaging update is available, and to otherwise perform server-side-driven interactions with messaging clients.

The messaging service 600 may comprise one or more group servers 618. The one or more group servers 618 may maintain lists of groups, add users to groups, remove users from groups, and perform the reception, caching, and forwarding of group chat messages.

The messaging service 600 may comprise one or more block list servers 620. The one or more block list servers 620 may maintain user-specific block lists, the user-specific incoming-block lists indicating for each user the one or more other users that are forbidden from transmitting messages to that user. Alternatively or additionally, the one or more block list servers 620 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 600 may comprise one or more last seen information servers 622. The one or more last seen information servers 622 may receive, store, and maintain information indicating the last seen location, status, messaging client, and other elements of a user's last seen connection to the messaging service 600.

The messaging service 600 may comprise one or more key servers 624. The one or more key servers may host public keys for public/private key encrypted communication.

The messaging service 600 may comprise one or more profile photo servers 626. The one or more profile photo servers 626 may store and make available for retrieval profile photos for the plurality of users of the messaging service 600.

The messaging service 600 may comprise one or more spam logging servers 628. The one or more spam logging servers 628 may log known and suspected spam (e.g., unwanted messages, particularly those of a promotional nature). The one or more spam logging servers 628 may be operative to analyze messages to determine whether they are spam and to perform punitive measures, in some embodiments, against suspected spammers (users that send spam messages).

The messaging service 600 may comprise one or more statistics servers 630. The one or more statistics servers may compile and store statistics information related to the operation of the messaging service 600 and the behavior of the users of the messaging service 600.

The messaging service 600 may comprise one or more web servers 632. The one or more web servers 632 may engage in hypertext transport protocol (HTTP) and hypertext transport protocol secure (HTTPS) connections with web browsers.

The messaging service 600 may comprise one or more chat activity monitoring servers 634. The one or more chat activity monitoring servers 634 may monitor the chats of users to determine unauthorized or discouraged behavior by the users of the messaging service 600. The one or more chat activity monitoring servers 634 may work in cooperation with the spam logging servers 628 and block list servers 620, with the one or more chat activity monitoring servers 634 identifying spam or other discouraged behavior and providing spam information to the spam logging servers 628 and blocking information, where appropriate to the block list servers 620.

The messaging service 600 may comprise one or more sync servers 636. The one or more sync servers 636 may sync the communication system 500 with contact information from a messaging client, such as an address book on a mobile phone, to determine contacts for a user in the messaging service 600.

The messaging service 600 may comprise one or more multimedia servers 638. The one or more multimedia servers may store multimedia (e.g., images, video, audio) in transit between messaging clients, multimedia cached for offline endpoints, and may perform transcoding of multimedia.

The messaging service 600 may comprise one or more payment servers 640. The one or more payment servers 640 may process payments from users. The one or more payment servers 640 may connect to external third-party servers for the performance of payments.

The messaging service 600 may comprise one or more registration servers 642. The one or more registration servers 642 may register new users of the messaging service 600.

The messaging service 600 may comprise one or more voice relay servers 644. The one or more voice relay servers 644 may relay voice-over-Internet-protocol (VoIP) voice communication between messaging clients for the performance of VoIP calls.

Figure 7:
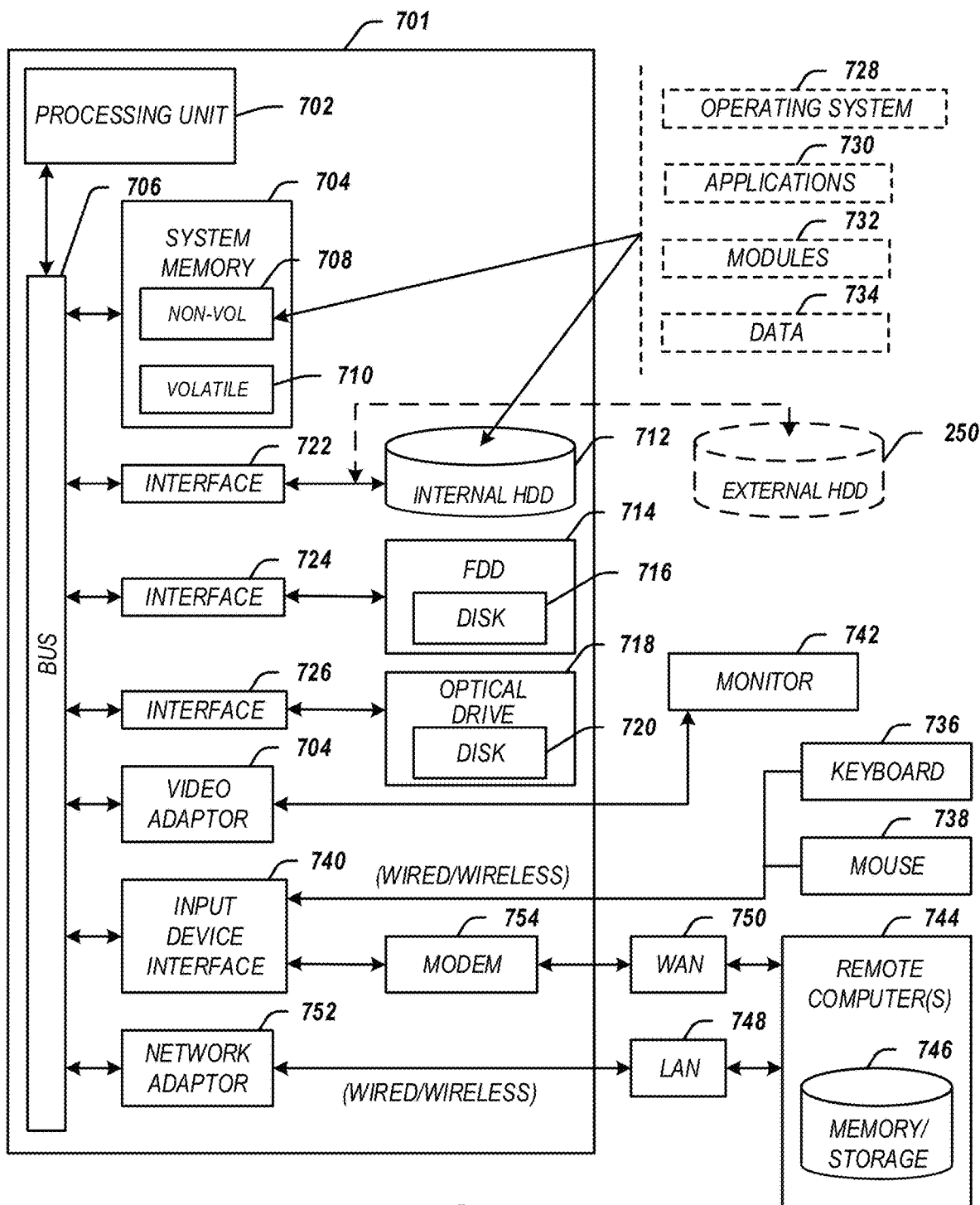
FIG. 7 is a block diagram illustrating an exemplary computing device suitable for use with exemplary embodiments.

The above-described methods may be embodied as instructions on a computer readable medium or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an Athlon®, Duron® and Opteron® processors; embedded and secure processors; DragonBall® and PowerPC® processors; Cell processors; Celeron®, Core (2) Duo®, Itanium®, Pentium®, Xeon®, and XScale® processors; and similar processors. Dual microprocessors, multi-core processors, and other multi-processor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the communication system 500.

A user can enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 744. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
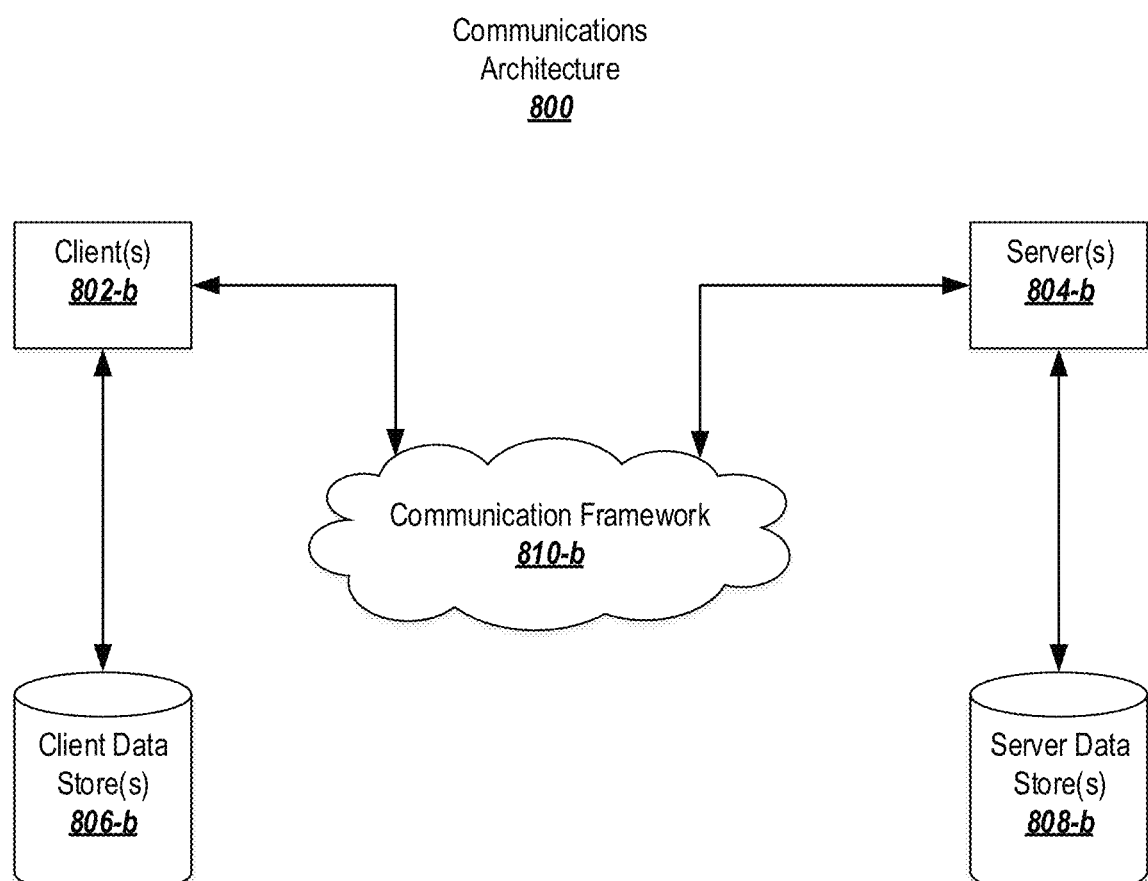
FIG. 8 depicts an exemplary communication architecture.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 may implement the client device 510. The servers 804 may implement the server device 526. The clients 802 and the servers 804 are operatively connected to one or more respective client data stores 806 and server data stores 808 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 9:
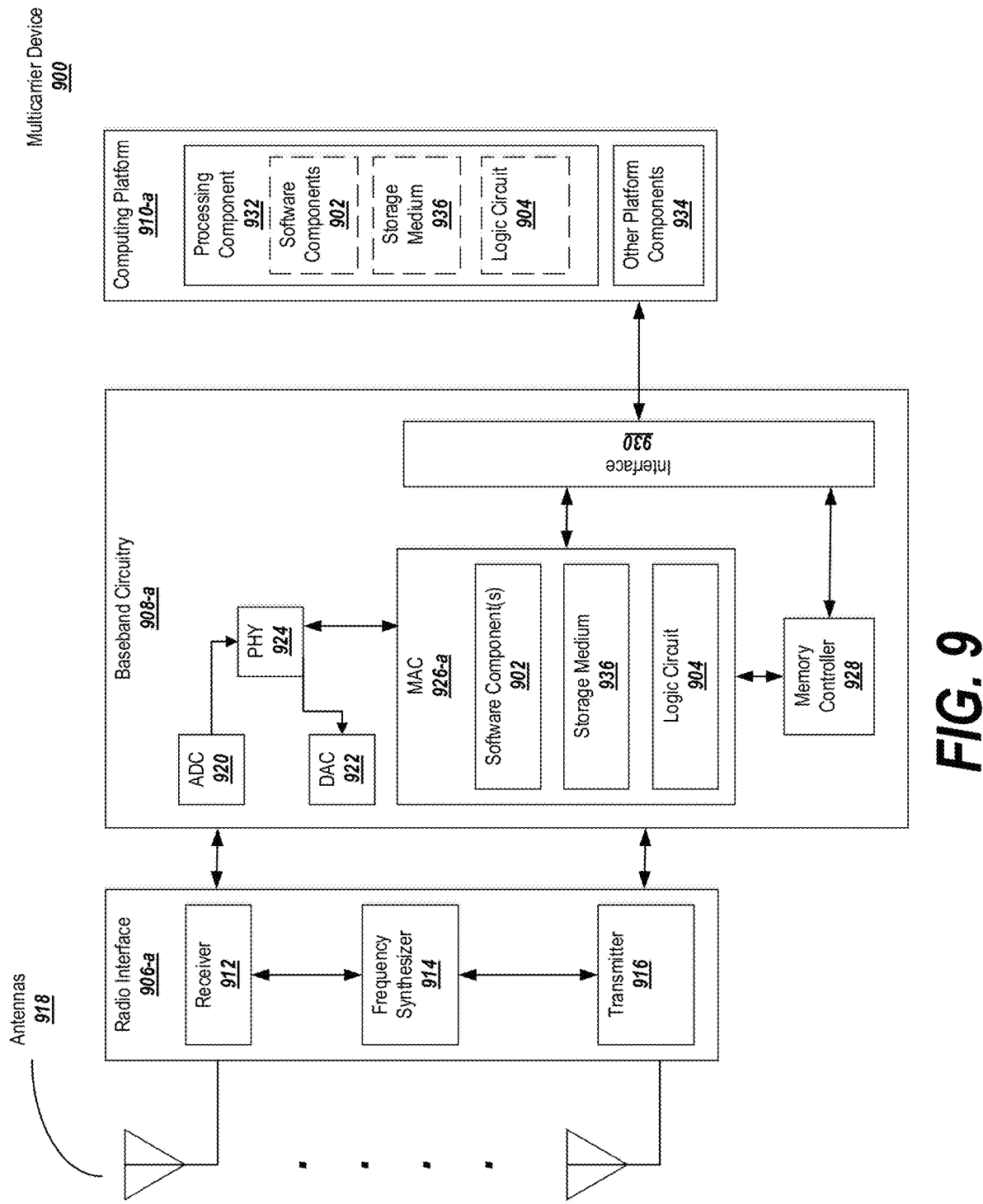
FIG. 9 is a block diagram depicting an exemplary multicarrier communications device.

FIG. 9 illustrates an embodiment of a device 900 for use in a multicarrier OFDM system, such as the communication system 500. The device 900 may implement, for example, software components 902 as described with reference to the messaging component logic 600, the intent determination logic 700, and the group selection logic 800. The device 900 may also implement a logic circuit 904. The logic circuit 904 may include physical circuits to perform operations described for the messaging system 600. As shown in FIG. 9, device 900 may include a radio interface 906, baseband circuitry 908, and a computing platform 910, although embodiments are not limited to this configuration.

The device 900 may implement some or all of the structure and/or operations for the communication system 500 and/or logic circuit 904 in a single computing entity, such as entirely within a single device. Alternatively, the device 900 may distribute portions of the structure and/or operations for the messaging system 600 and/or logic circuit 904 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 906 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio interface 906 may include, for example, a receiver 912, a transmitter 914 and/or a frequency synthesizer 916. The radio interface 906 may include bias controls, a crystal oscillator and/or one or more antennas 918. In another embodiment, the radio interface 906 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 908 may communicate with the radio interface 906 to process receive and/or transmit signals and may include, for example, an analog-to-digital converter 920 for down converting received signals, and a digital-to-analog converter 922 for up-converting signals for transmission. Further, the baseband circuitry 908 may include a baseband or physical layer (PHY) processing circuit 924 for PHY link layer processing of respective receive/transmit signals. The baseband circuitry 908 may include, for example, a processing circuit 926 for medium access control (MAC)/data link layer processing. The baseband circuitry 908 may include a memory controller 928 for communicating with the processing circuit 926 and/or a computing platform 910, for example, via one or more interfaces 930.

In some embodiments, the PHY processing circuit 924 may include a frame construction and/or detection module, in combination with additional circuitry such as a buffer memory, to construct and/or deconstruct communication frames, such as radio frames. Alternatively or in addition, the MAC processing circuit 926 may share processing for certain of these functions or perform these processes independent of the PHY processing circuit 924. In some embodiments, MAC and PHY processing may be integrated into a single circuit.

The computing platform 910 may provide computing functionality for the device 900. As shown, the computing platform 910 may include a processing component 932. In addition to, or alternatively of, the baseband circuitry 908, the device 900 may execute processing operations or logic for the communication system 500 and logic circuit 904 using the processing component 932. The processing component 932 (and/or the PHY 924 and/or MAC 926) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 910 may further include other platform components 934. Other platform components 934 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 900 described herein, may be included or omitted in various embodiments of the device 900, as suitably desired. In some embodiments, the device 900 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 900 may be implemented using single input single output (SISO) architectures. However, certain implementations may include multiple antennas (e.g., antennas 918) for transmission and/or reception using adaptive antenna techniques for beamforming or spatial division multiple access (SDMA) and/or using MIMO communication techniques.

The components and features of the device 900 may be implemented using any combination of discrete circuitry, application specific integrated circuits (ASICs), logic gates and/or single chip architectures. Further, the features of the device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 936 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising: accessing visual media; analyzing information associated with the visual media to identify a context of the visual media;
providing the context to a personalized language model configured to reflect a personal narrative style of the user; and
generating a caption for the visual media in the user's personal narrative style using the personalized language model, wherein generating the caption comprises applying the personalized language model in a first personal narrative style specific to the user for a first context and a second personal narrative style specific to the same user, differing from the first narrative style, in a second context differing from the first context.

2. The method of claim 1, wherein the context includes location information, a person in the visual media, a recognized object in the visual media, a location of the visual media, or a time at which the visual media is recorded.

3. The method of claim 1, wherein the personalized language model is configured using public-facing language collected from the user.

4. The method of claim 1, wherein the user is connected to a second user in a social graph, and wherein the personalized language model is configured using public-facing language of the second user.

5. The method of claim 1, wherein the caption serves as an index to the visual media for ranking or recommending the visual media.

6. The method of claim 1, wherein the visual media is provided through an API call from a third-party source.

7. A non-transitory computer-readable medium storing instructions configured to cause one or more processors to:
access visual media;
analyze information associated with the visual media to identify a context of the visual media;
provide the context to a personalized language model configured to reflect a personal narrative style of the user; and
generate a caption for the visual media in the user's personal narrative style using the personalized language model, wherein generating the caption comprises applying the personalized language model in a first personal narrative style specific to the user for a first context and a second personal narrative style specific to the same user, differing from the first narrative style, in a second context differing from the first context.

8. The medium of claim 7, wherein the context includes location information, a person in the visual media, a recognized object in the visual media, a location of the visual media, or a time at which the visual media is recorded.

9. The medium of claim 7, wherein the personalized language model is configured using public-facing language collected from the user.

10. The medium of claim 7, wherein the user is connected to a second user in a social graph, and wherein the personalized language model is configured using public-facing language of the second user.

11. The medium of claim 7, wherein the caption serves as an index to the visual media for ranking or recommending the visual media.

12. The medium of claim 7, wherein the visual media is provided through an API call from a third-party source.

13. An apparatus comprising:
a non-transitory computer readable medium configured to store instructions for interacting with visual media; and
a processor configured to execute the instructions, the instructions configured to cause the processor to:
access the visual media;
analyze information associated with the visual media to identify a context of the visual media;
provide the context to a personalized language model configured to reflect a personal narrative style of the user; and
generate a caption for the visual media in the user's personal narrative style using the personalized language model, wherein generating the caption comprises applying the personalized language model in a first personal narrative style specific to the user for a first context and a second personal narrative style specific to the same user, differing from the first narrative style, in a second context differing from the first context.

14. The apparatus of claim 13, wherein the context includes location information, a person in the visual media, a recognized object in the visual media, a location of the visual media, or a time at which the visual media is recorded.

15. The apparatus of claim 13, wherein the personalized language model is configured using public-facing language collected from the user.

16. The apparatus of claim 13, wherein the user is connected to a second user in a social graph, and wherein the personalized language model is configured using public-facing language of the second user.

17. The apparatus of claim 13, wherein the caption serves as an index to the visual media for ranking or recommending the visual media.

* * * * *